United States Patent
Kumazaki et al.

(10) Patent No.: US 10,569,662 B2
(45) Date of Patent: *Feb. 25, 2020

(54) VEHICLE CONTROL APPARATUS

(71) Applicants: Toyota Jidosha Kabushiki Kaisha, Toyota-shi (JP); Aisin AW Co., Ltd., Anjo-shi (JP)

(72) Inventors: Kenta Kumazaki, Anjo (JP); Takeshi Kitahata, Miyoshi (JP); Masato Yoshikawa, Toyota (JP); Hisashi Ishihara, Toyoake (JP); Hiromichi Kimura, Okazaki (JP); Kazuyuki Shiiba, Miyoshi (JP); Tooru Matsubara, Toyota (JP); Mitsuru Maeda, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/828,615

(22) Filed: Dec. 1, 2017

(65) Prior Publication Data

US 2018/0154796 A1 Jun. 7, 2018

(30) Foreign Application Priority Data

Dec. 2, 2016 (JP) ................................. 2016-235431

(51) Int. Cl.
*B60L 15/20* (2006.01)
*B60W 30/18* (2012.01)
(Continued)

(52) U.S. Cl.
CPC .......... *B60L 15/2054* (2013.01); *B60W 10/11* (2013.01); *B60W 10/115* (2013.01);
(Continued)

(58) Field of Classification Search
CPC ......... B60L 15/2054; B60W 30/18036; B60W 30/18045; B60W 30/18072; B60W 10/11–115; B60W 10/08
See application file for complete search history.

(56) References Cited

U.S. PATENT DOCUMENTS

| 6,729,198 B2 * | 5/2004 | Brandt | B60W 10/02 701/58 |
| 8,886,423 B1 * | 11/2014 | Dlugoss | B60W 10/11 475/292 |

(Continued)

FOREIGN PATENT DOCUMENTS

| JP | 06-284510 A | 10/1994 |
| JP | 08-163713 A | 6/1996 |

(Continued)

*Primary Examiner* — Erin D Bishop
(74) *Attorney, Agent, or Firm* — Oblon, McClelland, Maier & Neustadt, L.L.P.

(57) ABSTRACT

A control apparatus for a vehicle having an electric motor, and a step-variable transmission selectively placed in a speed position with engagement of a coupling device, wherein the vehicle runs rearward with a reverse drive torque of the electric motor generated in a forward-drive low-speed position of the transmission, is provided. The control apparatus includes: a first shift control portion temporarily increasing an input torque of the transmission to raise its input speed toward a synchronizing speed in the low-speed position, and commands an engaging-side coupling device to be brought into its engaged state after the input speed has been raised to a predetermined value; and a second shift control portion increasing an engaging force of the engaging-side coupling device to bring the engaging-side coupling device into the engaged state.

10 Claims, 9 Drawing Sheets

(51) Int. Cl.
*B60W 10/115* (2012.01)
*B60W 30/184* (2012.01)
*B60W 30/19* (2012.01)
*B60W 10/11* (2012.01)

(52) U.S. Cl.
CPC .. *B60W 30/18036* (2013.01); *B60W 30/1846* (2013.01); *B60W 30/18072* (2013.01); *B60W 30/19* (2013.01); *B60W 2510/083* (2013.01); *B60W 2510/105* (2013.01)

(56) References Cited

U.S. PATENT DOCUMENTS

| | | | |
|---|---|---|---|
| 9,061,675 B2* | 6/2015 | Dlugoss | F16H 61/061 |
| 9,090,247 B2* | 7/2015 | Kato | B60W 10/06 |
| 2019/0047565 A1* | 2/2019 | Ishihara | B60W 30/18036 |

FOREIGN PATENT DOCUMENTS

| | | |
|---|---|---|
| JP | 2007-153269 A | 6/2007 |
| JP | 2009-166643 | 7/2009 |
| JP | 2013-095316 A | 5/2013 |

* cited by examiner

| AT GEAR POSITION | C1 | C2 | B1 | B2 | F1 |
|---|---|---|---|---|---|
| 1st | ◯ | | | △ | ◯ |
| 2nd | ◯ | | ◯ | | |
| 3rd | ◯ | ◯ | | | |
| 4th | | ◯ | ◯ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

VEHICLE CONTROL APPARATUS

This application claims priority from Japanese Patent Application No. 2016-235431 filed on Dec. 2, 2016, the disclosure of which is herein incorporated by reference in its entirety.

FIELD OF THE INVENTION

The present invention relates to a control apparatus for a vehicle provided with an electric motor and a step-variable transmission for transmitting a drive force of the electric motor.

BACKGROUND OF THE INVENTION

There is well known a control apparatus for a vehicle provided with an electric motor functioning as a drive power source, and a step-variable transmission which constitutes a part of a power transmitting path between the electric motor and drive wheels and which is placed in a selected one of a plurality of gear or speed positions with engagement of selected at least one of a plurality of coupling devices. A control apparatus disclosed in JP-2009-166643A is an example of a control apparatus for this type of vehicular power transmitting system. This control apparatus is configured to control the vehicular power transmitting system upon a shift-down action of the step-variable transmission to its first speed position in a coasting run of the vehicle, such that an output torque of a second electric motor connected to an input shaft of the step-variable transmission is increased to increase an input torque of the step-variable transmission, for thereby raising a rotating speed of the input shaft of the step-variable transmission toward a synchronizing speed in the first speed position, and an engaging pressure of a coupling device to establish the first speed position is raised to place the coupling device in its fully engaged position when the rotating speed of the input shaft has reached a target value.

By the way, the vehicle may be run in the rearward direction with a reverse drive torque of an electric motor which is opposite in direction of its transmission to a forward drive torque of the electric motor and which is generated when the step-variable transmission is placed in a forward-drive low-speed position (a first speed position, for example) of its plurality of speed positions. If the reverse drive torque of the electric motor is generated during a shift-down action of the step-variable transmission to the forward-drive low-speed position in a coasting run of the vehicle as a result of an operation of a shift lever from a forward drive position D to a reverse drive position R (namely, as a result of an operator's requirement for reverse running of the vehicle), that is, if a rise of an input speed of the step-variable transmission is stopped as a result of switching of the output torque of the electric motor from the forward drive torque to the reverse drive torque, the shift-down action of the step-variable transmission in the coasting run of the vehicle does not progress, giving rise to a problem of delayed generation of a reverse vehicle drive force (reverse vehicle drive torque).

SUMMARY OF THE INVENTION

The present invention was made in view of the background art described above. It is therefore an object of the present invention to provide a control apparatus for a vehicle, which permits reduction of delay of generation of a reverse vehicle drive force upon requirement for switching to rearward running of the vehicle during a shift-down action of a step-variable transmission in a coasting run of the vehicle.

The object indicated above is achieved according to the following modes of the present invention:

According to a first mode of the invention, there is provided a control apparatus for a vehicle provided with an electric motor functioning as a drive power source, and a step-variable transmission which constitutes a part of a power transmitting path between the electric motor and vehicle drive wheels, said step-variable transmission being placed in a selected one of a plurality of speed positions with engagement of selected at least one of a plurality of coupling devices, wherein the vehicle runs in a rearward direction with a reverse drive torque of the electric motor which is opposite in direction of its transmission to a forward drive torque of the electric motor and which is generated when the step-variable transmission is placed in a forward-drive low-speed position of its plurality of speed positions, said control apparatus comprising: a first shift control portion which is operated during a shift-down action of the step-variable transmission to the forward-drive low-speed position in a coasting run of the vehicle, the first shift control portion being configured to temporarily increase the forward drive torque of the electric motor above its required value, for thereby temporarily increasing an input torque of the step-variable transmission, to raise an input speed of the step-variable transmission toward a synchronizing speed in the forward-drive low-speed position, the first shift control portion being configured to command an engaging-side coupling device, which is one of the above-indicated selected at least one coupling device for the forward-drive low-speed position and which was placed in its released state before the shift-down action, to be brought into its engaged state after the input speed has been raised to a predetermined value; and a second shift control portion operated when switching to rearward running of the vehicle is required during the shift-down action of the step-variable transmission in the coasting run of the vehicle, the second shift control portion being configured to increase an engaging force of the engaging-side coupling device for bringing the engaging-side coupling device toward its engaged state, to thereby raise the input speed of the step-variable transmission toward the synchronizing speed in the forward-drive low-speed position, to bring the engaging-side coupling device into the engaged state.

According to a second mode of the invention, the control apparatus according to the first mode of the invention is configured such that the second shift control portion limits generation of the reverse drive torque of the electric motor until an engaging action of the engaging-side coupling device is completed.

According to a third mode of the invention, the control apparatus according to the second mode of the invention is configured such that the second shift control portion limits the generation of the reverse drive torque of the electric motor by inhibiting the generation of the torque by the electric motor.

According to a fourth mode of the invention, the control apparatus according to the second mode of the invention is configured such that the second shift control portion limits the generation of the reverse drive torque of the electric motor by operating the electric motor to generate the forward drive torque.

According to a fifth mode of the invention, the control apparatus according to the second mode of the invention is configured such that the second shift control portion limits the generation of the reverse drive torque of the electric motor by limiting a value of the reverse drive torque to a predetermined lower limit.

The control apparatus according to the first mode of the invention is configured such that when switching to the rearward running of the vehicle is required during the coasting shift-down action of the step-variable transmission, the engaging force of the engaging-side coupling device is increased to bring the engaging-side coupling device toward its engaged state, for thereby raising the input speed of the step-variable transmission toward the synchronizing speed in the forward-drive low-speed position, to bring the engaging-side coupling device into its engaged state. Accordingly, the coasting shift-down action of the step-variable transmission can progress even if the rise of the input speed toward the synchronizing speed as a result of the temporary increase of the forward drive torque of the electric motor above the required value is stopped in response to the requirement for switching to the rearward running of the vehicle. Therefore, the control apparatus makes it possible to reduce the delay of generation of the reverse vehicle drive force upon the requirement for switching to the rearward running of the vehicle during the coasting shift-down action of the step-variable transmission.

According to the second through fifth modes of the invention, the second shift control portion limits generation of the reverse drive torque of the electric motor until the engaging action of the engaging-side coupling device is completed if switching to the rearward running of the vehicle is required during the coasting shift-down action. Accordingly, the amount of drop of the input speed of the step-variable transmission due to the reverse drive torque is reduced, making it possible to reduce the risk of failure to implement an adequate progress of the coasting shift-down action of the step-variable transmission. Thus, the delay of generation of the reverse vehicle drive force can be effectively reduced.

DETAILED DESCRIPTION OF PREFERRED EMBODIMENTS

Figure 1:
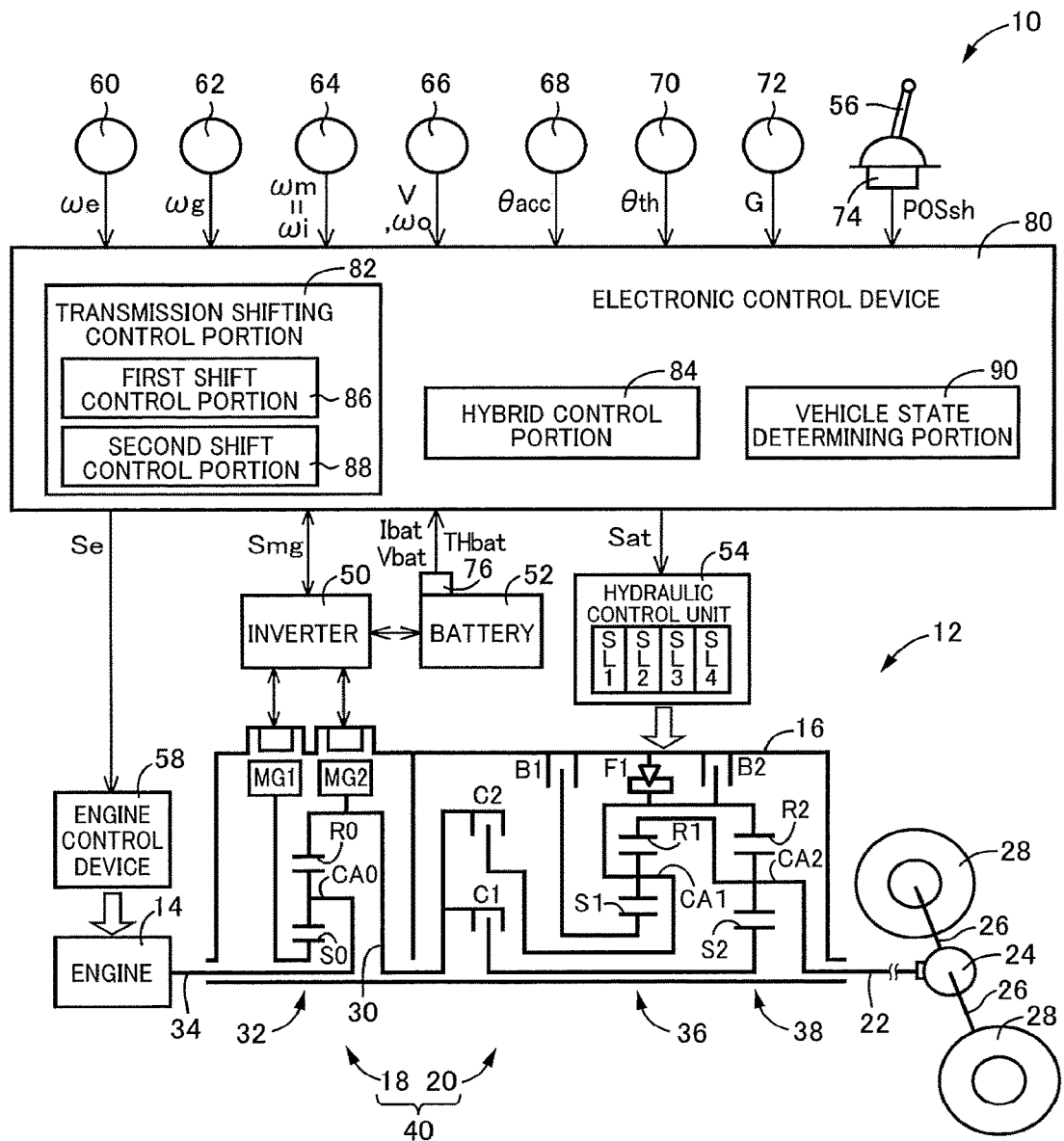
FIG. 1 is a schematic view showing an arrangement of a drive system of a vehicle to be controlled by a control apparatus according to the present invention, and major control functions and control portions of the control apparatus.

Referring to the drawings, preferred embodiments of the present invention will be described in detail.

EMBODIMENTS

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14, an electrically controlled continuously variable transmission portion 18 (hereinafter referred to as "continuously variable transmission portion 18") connected directly or indirectly via a damper (not shown) or any other device to the engine 14, and a mechanically operated step-variable transmission portion 20 (hereinafter referred to as "step-variable transmission portion 20") connected to an output rotary member of the continuously variable transmission portion 18. The continuously variable transmission portion 18 and the step-variable transmission portion 20 are disposed in series with each other within a transmission casing 16 (hereinafter referred to as "casing 16") functioning as a stationary member fixed to a body of the vehicle 10, such that the transmission portions 18 and 20 are disposed coaxially with each other on a common axis. The vehicular drive system 12 is further provided with a differential gear mechanism 24 connected to an output rotary member of the step-variable transmission portion 20 in the form of an output shaft 22, and a pair of axles 26 connected to the differential gear mechanism 24. In the vehicular drive system 12, a drive force ("drive torque" or "drive power" unless otherwise distinguished from the drive force) of the engine 14 and a second motor/generator MG2 (described below) is transmitted to the step-variable transmission portion 20, and is transmitted from the step-variable transmission portion 20 to drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously variable transmission portion 18 and the step-variable transmission portion 20 are constructed substantially symmetrically with each other about the axis of the engine 14 (about the above-indicated common axis), and that FIG. 1 does not show the lower halves of the transmission portions 18 and 20.

The engine 14 is a drive power source to drive the vehicle 10, which is a known internal combustion engine such as a gasoline engine or a diesel engine. An engine torque Te which is an output torque of this engine 14 is controlled by an electronic control device 80 (described below) which controls the operating condition of the engine 14 as represented by an opening angle of a throttle valve or an intake air quantity, an amount of injection of a fuel and an ignition timing. In the present embodiment, the engine 14 is connected to the continuously variable transmission portion 18, without a fluid-operated type power transmitting device such as a torque converter or a fluid coupling being disposed between the engine 14 and the transmission portion 18.

The continuously variable transmission portion 18 is provided with: a first motor/generator MG1; a differential mechanism 32 functioning as a power distributing device to mechanically distribute the drive force of the engine 14 to the first motor/generator MG1, and to an intermediate power transmitting member 30 which is an output rotary member of the continuously variable transmission portion 18; and the second motor/generator MG2 operatively connected to the intermediate power transmitting member 30. The continuously variable transmission portion 18 is an electrically controlled continuously variable transmission wherein a differential state of the differential mechanism 32 is controllable by controlling an operating state of the first motor/generator MG1. The first motor/generator MG1 functions as a differential motor/generator while the second motor/generator MG2 is an electric motor which functions as a drive power source, namely, a vehicle driving motor/generator. The vehicle 10 is a hybrid vehicle provided with the drive power source in the form of the engine 14 and the second motor/generator MG2.

Each of the first motor/generator MG1 and the second motor/generator MG2 is an electrically operated rotary device having a function of an electric motor and a function of an electric generator. The first motor/generator MG1 and the second motor/generator MG2 are connected to an electric power storage device in the form of a battery 52 through an inverter 50. The inverter 50 provided on the vehicle 10 is controlled by the control apparatus in the form of the above-indicated electronic control device 80 described below in detail, to control an output torque (regenerative torque) of the first motor/generator MG1, namely, an MG1 torque Tg, and an output torque (forward driving torque) of the second motor/generator MG2, namely, an MG2 torque Tm. The battery 52 also provided on the vehicle 10 is the electric power storage device to and from which an electric power is supplied from and to the first motor/generator MG1 and the second motor/generator MG2.

The differential mechanism 32 is a planetary gear set of a single-pinion type having a sun gear S0, a carrier CA0 and a ring gear R0. The carrier CA0 is operatively connected to the engine 14 through a connecting shaft 34 in a power transmittable manner, and the sun gear S0 is operatively connected to the first motor/generator MG1 in a power transmittable manner, while the ring gear R0 is operatively connected to the second motor/generator MG2 in a power transmittable manner. In the differential mechanism 32, the carrier CA0 functions as an input rotary element, and the sun gear S0 functions as a reaction rotary element, while the ring gear R0 functions as an output rotary element.

The step-variable transmission portion 20 is a step-variable transmission which constitutes a part of a power transmitting path between the intermediate power transmitting member 30 and the drive wheels 28. The intermediate power transmitting member 30 also functions as an input rotary member of the step-variable transmission portion 20. The step-variable transmission portion 20 is considered to also constitute a part of a power transmitting path between the second motor/generator MG2 and the drive wheels 28, since the second motor/generator MG2 is connected to the intermediate power transmitting member 30 such that the intermediate power transmitting member 30 is rotated together with the second motor/generator MG2. The step-variable transmission portion 20 is a known automatic transmission of a planetary gear type which is provided with a plurality of planetary gear sets in the form of a first planetary gear set 36 and a second planetary gear set 38, and a plurality of coupling devices in the form of a clutch C1, a clutch C2, a brake B1 and a brake B2 (hereinafter referred to as "coupling devices CB" unless otherwise specified).

Each of the coupling devices CB is a hydraulically operated frictional coupling device in the form of a multiple-disc type or a single-disc type clutch or brake that is operatively pressed by a hydraulic actuator, or a band brake that is operatively tightened by a hydraulic actuator. The coupling devices CB are selectively placed in engaged, slipped or released states with their torque capacities (engaging torque values) Tcb being changed according to engaging hydraulic pressures Pcb applied thereto, which are regulated by respective solenoid-operated valves SL1-SL4 incorporated within a hydraulic control unit 54. In order for each coupling device CB to be able to transmit a torque (for example, an AT input torque Ti which is an input torque of the step-variable transmission portion 20) between the intermediate power transmitting member 30 and the output shaft 22, without a slipping action (without a speed difference between input and output elements of the coupling device CB), the relevant coupling device CB should be given an engaging torque Tcb enough to permit transmission of a component of the input torque, which is assigned to be transmitted by the coupling device CB in question, that is, to permit transmission of an assigned torque (CB-transmitted torque) to be transmitted through the coupling device CB. However, it is noted that an increase of the engaging torque Tcb enough to obtain the CB-transmitted torque does not cause an increase of the CB-transmitted torque. That is, the engaging torque Tcb is equivalent to a maximum value of the torque that can be transmitted through the coupling device CB, and the CB-transmitted torque is equivalent to the torque that is actually transmitted through the coupling device CB. It is noted that the engaging torque (CB-transmitted torque) Tcb and the engaging hydraulic pressure Pcb are proportional to each other, before the engaging hydraulic pressure Pcb has been raised to initiate an engaging contact of the input and output elements with each other.

In the step-variable transmission portion 20, selected ones of rotary elements (sun gears S1 and S2, carriers CA1 and CA2, and ring gears R1 and R2) of the first and second planetary gear sets 36 and 38 are connected to each other or to the intermediate power transmitting member 30, casing 16 or output shaft 22, either directly or indirectly (selectively) through the coupling devices CB or a one-way clutch F1.

The step-variable transmission portion 20 is shifted to a selected one of four AT gear positions (speed positions) by engaging actions of selected ones of the coupling devices CB. These four AT gear positions have respective different speed ratios γat (=AT input speed ωi/AT output speed ωo). The AT input speed ωi is a rotating speed (angular velocity) of the input rotary member of the step-variable transmission portion 20, that is, a rotating speed of the intermediate power transmitting member 30, which is equal to an MG2 speed corn which is an operating speed of the second motor/generator MG2. Thus, the AT input speed ωi can be represented by the MG2 speed ωm. The AT output speed ωo is a rotating speed of the output shaft 22 of the step-variable transmission portion 20, which is considered to be an output speed of a transmission device 40 which consists of the continuously variable transmission portion 18 and the step-variable transmission portion 20.

Figures 2, 3:
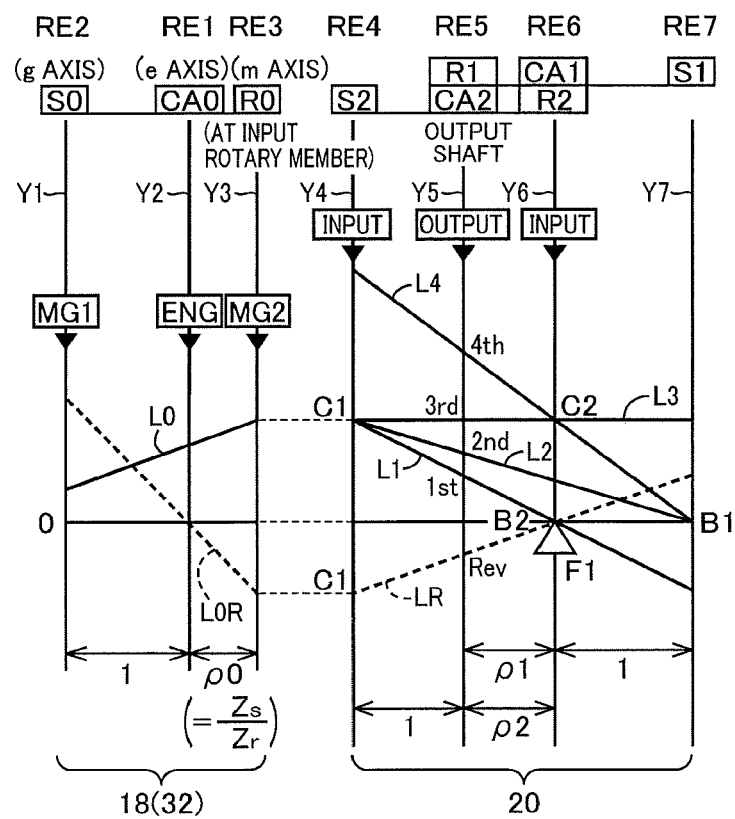
FIG. 2 is a table indicating a relationship between gear positions of a mechanically operated step-variable transmission portion shown in FIG. 1 and combinations of coupling devices placed in engaged states to establish the respective gear positions.
FIG. 3 is a collinear chart indicating a relationship among rotating speeds of rotary elements of an electrically controlled continuously variable transmission portion also shown in FIG. 1 and the mechanically operated step-variable transmission portion.

Reference is now made to FIG. 2, which is the table indicating the relationship between the first through fourth speed AT gear positions of the step-variable transmission portion 20 shown in FIG. 1 and combinations of the coupling devices CB placed in the engaged states to establish the respective AT gear positions. In the table, the four forward drive AT gear positions are respectively represented by "$1^{st}$", "$2^{nd}$", "$3^{rd}$" and "$4^{th}$". The first speed AT gear position "$1^{st}$" has a highest speed ratio γat, and the speed ratios γat of the four AT gear positions decrease in the direction from the first speed AT gear position (lowest-speed gear position) "$1^{st}$" toward the fourth speed AT gear position (highest-speed gear position) "$4^{th}$". In the table, "O" indicates the engaged state of the coupling devices CB, "Δ" indicates the engaged state of the coupling device B2 during application of an engine brake to the vehicle 10 or during a shift-down action of the step-variable transmission portion 20 while the vehicle 10 is in a coasting run, while the blank indicates the released state of the coupling devices CB. The one-way clutch F1 indicated above is disposed in parallel to the brake B2 which is placed in the engaged state to establish the first speed AT gear position "$1^{st}$", so that the brake B2 is not required to be placed in the engaged state upon starting or acceleration of the vehicle 10. The above-indicated shift-down action of the step-variable transmission portion 20 in the coasting run of the vehicle 10 is a kind of "power-off shift-down action" which is required as a result of reduction of a vehicle-speed-related value (vehicle running speed V, for example) due to reduction of a required drive force (as represented by an operation amount θacc of an accelerator pedal) or during deceleration of the vehicle 10 in a released position of the accelerator pedal (with the operation amount θacc of the accelerator pedal being zero or substantially zero), and is a shift-down action which is required during deceleration of the vehicle 10 in the released position of the accelerator pedal. It is noted that the step-variable transmission portion 20 is placed in a neutral position (a power transmission cutoff state) when all of the coupling devices CB are placed in the released states.

The step-variable transmission portion 20 is shifted up or down to establish a newly selected one of the four AT gear positions, according to the operation amount θacc of the accelerator pedal and the vehicle running speed V, with a releasing action of one of the coupling devices CB and a concurrent engaging action of another coupling device CB, which concurrent releasing and engaging actions are controlled by the above-indicated electronic control device 80. The above-indicated one coupling device CB is a releasing-side coupling device which was placed in the engaged state before the step-variable transmission portion 20 is shifted to establish the newly selected AT gear position, while the above-indicated another coupling device CB is an engaging-side coupling device which is placed in the engaged state while the step-variable transmission portion 20 is placed in the newly selected AT gear position. Thus, the step-variable transmission portion 20 is shifted up or down from one of the AT gear positions to another by so-called "clutch-to-clutch" shifting operation, namely, concurrent releasing and engaging actions of the selected two coupling devices CB. For instance, the step-variable transmission portion 20 is shifted down from the second speed AT gear position "$2^{nd}$" to the first speed AT gear position "$1^{st}$", with the releasing action of the brake B1 serving as the releasing-side coupling device and the concurrent engaging action of the brake B2 serving as the engaging-side coupling device, as indicated in the table of FIG. 2. In this respect, it is noted that the first speed AT gear position "$1^{st}$" is established in the engaged states of the clutch C1 and the brake B2, while the brake B2 is placed in the released state in the second speed AT gear position "$2^{nd}$", so that the brake B2 is brought into the engaged state to shift down the step-variable transmission portion 20 to from the second speed AT gear position "$2^{nd}$" to the first speed AT gear position "$1^{st}$". In this instance, the hydraulic pressures applied to the brakes B1 and B2 are transiently controlled according to predetermined patterns to bring these brakes B1 and B2 into the released and engaged states, respectively.

The collinear chart of FIG. 3 indicates the relationship among rotating speeds of the rotary elements of the continuously variable transmission portion 18 and the step-variable transmission portion 20. In this collinear chart, three vertical lines Y1, Y2 and Y3 corresponding to the respective three rotary elements of the differential mechanism 32 of the continuously variable transmission portion 18 respectively represent a "g" axis representing the rotating speed of the second rotary element RE2 in the form of the sun gear S0, an "e" axis representing the rotating speed of the first rotary element RE1 in the form of the carrier CA0, and an "m" axis representing the rotating speed of the third rotary element RE3 in the form of the ring gear R0 (i.e., the input speed of the step-variable transmission portion 20). Further, four vertical lines Y4, Y5, Y6 and Y7 corresponding to the respective four rotary elements of the step-variable transmission portion 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio ρ0 of the differential mechanism 32, while the distances between the adjacent ones of the vertical lines Y4-Y7 are determined by gear ratios ρ1 and ρ2 of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio ρ of the planetary gear set (=number of teeth Zs of the sun gear/number of teeth Zr of the ring gear).

Referring to the collinear chart of FIG. 3, the differential mechanism 32 of the continuously variable transmission portion 18 is arranged such that the engine 14 (represented as "ENG" in the collinear chart) is connected to the first rotary element RE1, and the first motor/generator MG1 (represented as "MG1" in the collinear chart) is connected to the second rotary element RE2, while the second motor/generator MG2 (represented as "MG2" in the collinear chart) is connected to the third rotary element RE3 which is rotated together with the intermediate power transmitting member 30. Thus, a rotary motion of the engine 14 is transmitted to the step-variable transmission portion 20 through the intermediate power transmitting member 30. In a part of the collinear chart corresponding to the continuously variable transmission portion 18, straight lines L0 and L0R intersecting the vertical line Y2 represent a relationship between the rotating speeds of the sun gear S0 and the ring gear R0.

The step-variable transmission portion 20 is arranged such that the fourth rotary element RE4 is selectively connected to the intermediate power transmitting member 30 through the clutch C1, the fifth rotary element RE5 is connected to the output shaft 22, the sixth rotary element RE6 is selectively connected to the intermediate power transmitting member 30 through the clutch C2 and is selectively connected to the casing 16 through the brake B2, and the seventh rotary element RE7 is selectively connected to the casing 16 through the brake B1. In a part of the collinear chart corresponding to the step-variable transmission portion 20, straight lines L1, L2, L3, L4 and LR intersecting the vertical line Y5 represent the rotating speeds of the output shaft 22 in the respective first, second, third, fourth speed and reverse drive AT gear positions "$1^{st}$", "$2^{nd}$", "$3^{rd}$", "$4^{th}$" and "Rev" that are selectively established with selective engaging and releasing actions of the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 and in the hybrid drive mode, when a torque Te of the engine 14 (engine torque Te) is applied to the carrier CA0 while a reaction torque which is a negative torque generated by the first motor/generator MG1 operated in the positive direction is applied to the sun gear S0, a directly transmitted engine torque Td ($=Te/(1+\rho)=-(1/\rho)*Tg$) which is a positive torque is applied to the ring gear R0, whereby the ring gear R0 is rotated in the positive direction with the engine torque Td. The vehicle 10 is driven in the forward direction with a vehicle drive torque which is a sum of the directly transmitted engine torque Td and the MG2 torque Tm and which is transmitted to the drive wheels 28 through the step-variable transmission portion 20 selectively placed in one of the first through fourth speed AT gear positions according to a required vehicle drive force. At this time, the first motor/generator MG1 functions as an electric generator operated in the positive direction, and generates a negative torque. An electric power Wg generated by the first motor/generator MG1 is stored in the battery 52 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 52.

In the differential mechanism 32 and in a motor drive mode in which the vehicle 10 is driven with a drive force generated by the second motor/generator MG2 operated as a drive power source while the engine 14 is held at rest, the carrier CA0 is held stationary while the MG2 torque Tm which is a positive torque is applied to the ring gear R0, whereby the ring gear R0 is rotated in the positive direction with the MG2 torque Tm. In this motor drive mode, the state of the differential mechanism 32 is not shown in the collinear chart of FIG. 3. At this time, the first motor/generator MG1 connected to the sun gear S0 is placed in a non-load state and freely operated in the negative direction. Namely, in the motor drive mode, the engine 14 is held in a non-operated state, so that an operating speed ωe of the engine 14 (engine speed ωe) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear positions.

Broken straight lines L0R and LR indicated in FIG. 3 indicate relative rotating speeds of the rotary elements during a reverse running of the vehicle 10 in the motor drive mode. When the vehicle 10 is driven in the rearward direction in this motor drive mode, the MG2 torque Tm which is a negative torque is applied to the ring gear R0, and rotates the ring gear R0 in the negative direction, and is transmitted as a rear drive torque of the vehicle 10 to the drive wheels 28 through the step-variable transmission portion 20 placed in the first speed AT gear position. As described below, the electronic control device 80 controls the second motor/generator MG2 to permit the vehicle 10 to be driven in the rearward direction with the MG2 torque Tm generated while the step-variable transmission portion 20 is placed in the forward-drive low-speed gear position in the form of the first speed AT gear position which is one of the first through fourth speed AT gear positions. The above-indicated MG2 torque Tm is a reverse drive torque Tm of the second motor/generator MG2 (a negative torque generated with an operation of the second motor/generator MG2 in the negative direction, which is specifically referred to as "MG2 torque TmR") which is opposite in the direction of its transmission to a forward drive torque Tm of the second motor/generator MG2 (a positive torque generated with an operation of the second motor/generator MG2 in the positive direction, which is specifically referred to as "MG2 torque TmF"). Thus, the vehicle 10 to be controlled by the electronic control device 80 is driven in the rearward direction by operating the second motor/generator MG2 in the negative direction to generate the negative torque Tm while the step-variable transmission portion 20 is placed in the forward-drive AT gear position (which is also used to drive the vehicle 10 in the forward direction). Namely, when the vehicle 10 is driven in the rearward direction, the step-variable transmission portion 20 does not have a reverse drive AT gear position in which the rotational direction of the output rotary member is reversed with respect to the rotational direction of the input rotary member. It is noted that the vehicle 10 can be driven in the rearward direction in the hybrid drive mode as well as in the motor drive mode, since the second motor/generator MG2 can be operated in the negative direction, as indicated by the straight line L0R.

In the vehicular drive system 12, the continuously variable transmission portion 18 functions as an electrically controlled shifting mechanism (electrically controlled differential mechanism) provided with the differential mechanism 32 the differential state of which is controlled by controlling the operating state of the first motor/generator MG1 provided as the differential electric motor (differential motor/generator), and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the intermediate power transmitting member 30 is connected (in other words, to which the second motor/generator MG2 provided as the vehicle driving electric motor (vehicle driving motor/generator) is operatively connected) in a power transmittable manner. Namely, the continuously variable transmission portion 18 has the differential mechanism 32 to which the engine 14 is operatively connected in a power transmittable manner, and the first motor/generator MG1 to which the differential mechanism 32 is operatively connected in a power transmittable manner, and the operating state of which is controlled to control the differential state of the differential mechanism 32. The continuously variable transmission portion 18 is operated as an electrically controlled continuously variable transmission a speed ratio $\gamma 0$ (=$\omega e/\omega m$) of which is variable. The speed ratio is a ratio of rotating speed of the connecting shaft 34 (namely, engine speed $\omega e$) to the rotating speed of the intermediate power transmitting member 30 (namely, MG2 speed $\omega m$).

In the hybrid drive mode, for instance, the rotating speed of the sun gear S0 is raised or lowered by controlling operating speed of the first motor/generator MG1 while the rotating speed of the ring gear R0 is determined by rotating speed of the drive wheels 28 with the step-variable transmission portion 20 placed in one of the AT gear positions, so that the rotating speed of the carrier CA0 (namely, engine speed $\omega e$) is accordingly raised or lowered. For running of the vehicle 10 with an operation of the engine 14, therefore, the engine 14 can be operated at an efficient operating point. That is, the step-variable transmission portion 20 to be placed in a selected one of the AT gear positions and the continuously variable transmission portion 18 functioning as a continuously variable transmission cooperate to provide the transmission device 40 which functions as a continuously variable transmission as a whole.

Alternatively, the continuously variable transmission portion 18 can be shifted like a step-variable transmission. Accordingly, the transmission device 40 constituted by the step-variable transmission portion 20 to be placed in one of the AT gear positions and the continuously variable transmission portion 18 which can be shifted like the step-variable transmission can be shifted like a step-variable transmission as a whole. That is, the step-variable transmission portion 20 and the continuously variable transmission portion 18 can be controlled to selectively establish a plurality of speed positions (hereinafter referred to as "overall speed positions" or "conceptual speed positions") having respective different values of a speed ratio $\gamma t$ (=$\omega e/\omega o$) which is a ratio of the engine speed $\omega e$ to the output speed $\omega o$. The speed ratio $\gamma t$ is an overall speed ratio of the transmission device 40 consisting of the continuously variable transmission portion 18 and the step-variable transmission portion 20 which are disposed in series with each other. The overall speed ratio $\gamma t$ is equal to a product of the speed ratio $\gamma 0$ of the continuously variable transmission portion 18 and the speed ratio $\gamma at$ of the step-variable transmission portion 20, namely, $\gamma t=\gamma 0*\gamma at$.

Figures 4, 5:
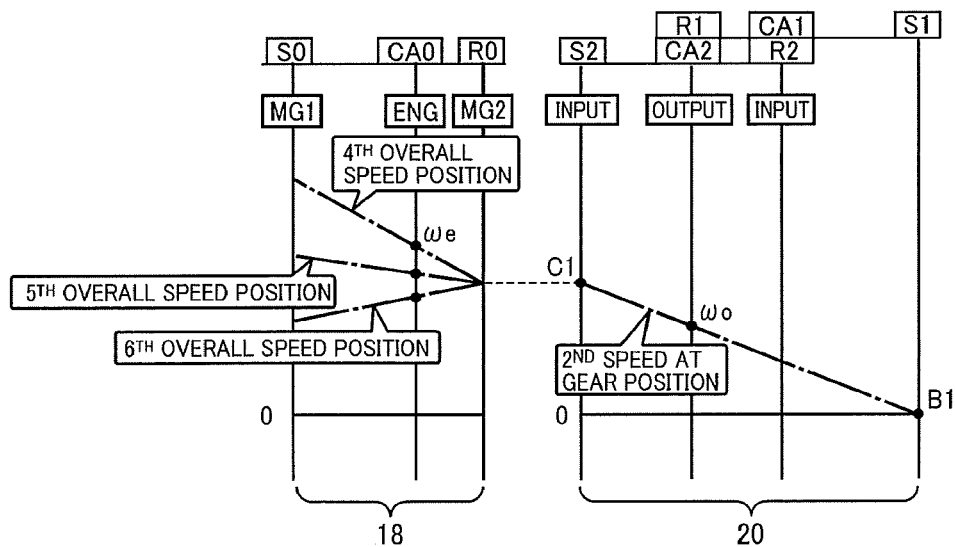
FIG. 4 is a table indicating an example of a plurality of overall speed positions of a transmission device in relation to the gear positions of the step-variable transmission portion.
FIG. 5 is a view indicating the fourth through sixth overall speed positions of the transmission device in which the second speed gear position of the step-variable transmission portion is established, on a collinear chart similar to that of FIG. 3.

At least one overall speed position is provided for each of the four AT gear positions of the step-variable transmission portion 20, with a combination of each AT gear position with at least one of the different speed ratio values $\gamma 0$ of the continuously variable transmission portion 18. FIG. 4 is the table indicating an example of the overall speed positions of the transmission device 40, wherein first through third overall speed positions are established for the first speed AT gear position, fourth through sixth overall speed positions are established for the second speed AT gear position, the seventh through ninth overall speed positions are established for the third speed AT gear position, and a tenth overall speed position is established for the fourth speed AT gear position. FIG. 5 is the view indicating the fourth through sixth overall speed positions of the transmission device 40 in which the second speed AT gear position of the step-variable transmission portion 20 is achieved, on a collinear chart similar to that of FIG. 3. In the transmission device 40, the continuously variable transmission portion 18 is controlled to control the engine speed $\omega e$ with respect to the output speed $\omega o$ for establishing the predetermined overall speed ratio values $\gamma t$, to thereby establish each of the overall speed positions.

Referring back to FIG. 1, the vehicle 10 is provided with the control apparatus in the form of the electronic control device 80 configured to control various devices of the vehicle 10 such as the engine 14, continuously variable transmission portion 18 and step-variable transmission portion 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 receives various input signals such as: an output signal of an engine speed sensor 60 indicative of the engine speed $\omega e$; an output signal of an MG1 speed sensor 62 indicative of the MG1 speed $\omega g$ which is the operating speed of the first motor/generator MG1; an output signal of an MG2 speed sensor 64 indicative of the MG2 speed $\omega m$ which is the AT input speed $\omega i$; an output signal of an output speed sensor 66 indicative of the output speed $\omega o$ corresponding to the vehicle running speed V; an output signal of an accelerator pedal operation amount sensor 68 indicative of the operation amount $\theta acc$ of the accelerator pedal, which operation amount $\theta acc$ represents a degree of acceleration of the vehicle 10 required by a vehicle operator; an output signal of a throttle valve opening angle sensor 70 indicative of an angle $\theta th$ of opening of an electronic throttle valve; an output signal of an acceleration sensor 72 indicative of a longitudinal acceleration value G of the vehicle 10; an output signal of a shift position sensor 74 indicative of a presently selected operating position POSsh of a manually operated shifting member in the form of a shift lever 56 provided in the vehicle 10; and output signals of a battery sensor 76 indicative of a temperature THbat, a charging/discharging electric current Ibat and a voltage Vbat of the battery 52. Further, the electronic control device 80 generates various output signals such as: an engine control command signal Se to be applied to an engine control device 58 provided to control a throttle actuator, a fuel injecting device and an ignition device, for controlling the engine 14; motor/generator control command signals Smg to be applied to the inverter 50, for controlling the first motor/generator MG1 and the second motor/generator MG2; and hydraulic control command signals Sat to be applied to the hydraulic control unit 54, for controlling the operating states of the coupling devices CB (namely, for controlling the shifting actions of the step-variable transmission portion 20). The hydraulic control command signals Sat are command signals (drive currents) to be applied to the hydraulic control unit 54 for controlling amounts of electric currents to be applied to the solenoid-operated valves SL1-SL4 which regulate the engaging hydraulic pressure Pcb to be applied to each of the hydraulic actuators of the coupling devices CB. The electronic control device 80 operates to set a hydraulic pressure command value (command pressure value) corresponding to the engaging hydraulic pressure Pcb to be applied to each of the hydraulic actuators, and outputs a drive current corresponding to the hydraulic pressure command value.

The presently selected operating position POSsh of the shift lever 56 is one of: a parking position P; a reverse drive position R; a neutral position N; and a forward drive position D, for example. The parking position P is a position which is established while the transmission device 40 is placed in a neutral state (in which the step-variable transmission portion 20 is placed in a non-power transmittable state with all of the coupling devices CB placed in their released state) and in which the output shaft 22 is mechanically locked to prevent its rotary motion, for thereby holding the transmission device 40 in a parking brake position. The reverse drive position R is a position in which the transmission device 40 is placed in a rear drive state in which the vehicle 10 can be driven in the rearward direction with the MG2 torque TmR while the step-variable transmission portion 20 is placed in the first speed AT gear position. The neutral position N is a position in which the transmission device 40 is placed in the above-indicated neutral state. The forward drive position D is a position in which the transmission device 40 is placed in a forward drive state in which the vehicle 10 can be driven in the forward direction according to an automatic shifting control to selectively establish one of all of the first through fourth speed AT gear positions (one of all of the first through tenth overall speed positions). Therefore, when the shift lever 56 is switched from the forward drive position D to the rear drive position R, the transmission device 40 is commanded to be switched from its forward drive state to the rear drive state (namely, to perform a switching action from the forward drive state to the rear drive state). Thus, the manually operated shift lever 56 functions as a manually operated member for commanding the transmission device 40 in a selected one of its operating states describe above.

The electronic control device 80 is configured to calculate a charging state (stored electric power amount) SOC of the battery 52 on the basis of the charging/discharging electric current Ibat and the voltage Vbat of the battery 52. The electronic control device 80 is further configured to calculate, on the basis of, for example, the temperature THbat and the charging state SOC of the battery 52, a maximum charging amount Win of electric power that can be stored in the battery 52, and a maximum discharging amount Wout of electric power that can be discharged from the battery 52, which maximum charging and discharging amounts Win and Wout define a range of an electric power of the battery 52 that can be used. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

The electronic control device 80 includes transmission shifting control means in the form of a transmission shifting control portion 82, and hybrid control means in the form of a hybrid control portion 84, for performing various controls of the vehicle 10.

The transmission shifting control portion 82 is configured to determine a shifting action of the step-variable transmission portion 20 according to a memory-stored AT gear position shifting map obtained by experimentation or determined by an appropriate design theory, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission portion 20. The AT gear position shifting map indicated above is a predetermined relationship between two variables in the form of the output speed ωo (equivalent to the vehicle running speed V) and the accelerator pedal operation amount θacc (equivalent to a required drive torque Tdem and the throttle valve opening angle θth), which relationship is used to determine a shifting action of the step-variable transmission portion 20 and is represented by shift-up and shift-down shifting lines in a two-dimensional coordinate system in which the output speed ωo and the accelerator pedal operation amount θacc are taken along respective two axes.

The hybrid control portion 84 has a function of an engine control means or portion to control the engine 14, and a function of a motor/generator control means or portion to control the first motor/generator MG1 and the second motor/generator MG2 through the inverter 50. Thus, the hybrid control portion 84 performs hybrid drive controls for controlling the engine 14, first motor/generator MG1 and second motor/generator MG2. The hybrid control portion 84 is configured to calculate a required vehicle drive power Pdem on the basis of the accelerator pedal operation amount θacc and the vehicle running speed V, and according to a predetermined relationship in the form of a drive force map, for instance. In other words, the hybrid control portion 84 calculates the required drive torque Tdem at the present vehicle running speed V. The hybrid control portion 84 generates the engine control command signal Se to control the engine 14, and the motor/generator control command signal Smg to control the first motor/generator MG1 and the second motor/generator MG2, for establishing the required vehicle drive power Pdem, while taking account of the maximum charging and discharging amounts Win and Wout of electric power of the battery 52. For example, the engine control command signal Se represents a command value of a power Pe of the engine 14 generating the torque Te at its present operating speed ωe. For example, the motor/generator control command signals Smg represent a command value of an electric power amount Wg to be generated by the first motor/generator MG1 to generate the reaction torque counteracting the engine torque Te, namely, the MG1 torque Tg at the present MG1 speed ωg, and an electric power amount Wm to be consumed by the second motor/generator MG2 to generate the MG2 torque Tm at the present MG2 speed ωm.

When the transmission device 40 as a whole is operated as the continuously variable transmission while the continuously variable transmission portion 18 is operated as the continuously variable transmission, for instance, the hybrid control portion 84 controls the engine 14 and the electric power amount Wg to be generated by the first motor/generator MG1, so as to establish the engine speed ωe and the engine torque Te for obtaining the engine power Pe to establish the required vehicle drive power Pdem, while taking account of a highest fuel economy point of the engine 14, so that the speed ratio γ0 of the continuously variable transmission portion 18 is controlled so as to be continuously varied. As a result, the speed ratio γt of the transmission device 40 is controlled while the continuously variable transmission portion 18 is operated as the continuously variable transmission.

When the transmission device 40 as a whole is operated as the step-variable transmission while the continuously variable transmission portion 18 is operated as the step-variable transmission, for instance, the hybrid control portion 84 determines a shifting action of the transmission device 40 according to an overall speed position shifting map, for example, and performs a shifting control of the continuously variable transmission portion 18 to establish a selected one of the plurality of overall speed positions, in cooperation with the transmission shifting control portion 82 to shift the step-variable transmission portion 20 selectively to the AT gear positions. The plurality of overall speed positions can be established by controlling the first motor/generator MG1 to control the engine speed ωe according to the output speed ωo so as to maintain the respective speed ratio values γt. It is noted that the speed ratio γt of each of the overall speed positions does not necessarily have to be held constant over an entire range of the output speed ωo, but may be changed in a certain part or parts of the entire range of the output speed ωo or may be given a limitation or limitations, for example, depending on upper and lower limits of rotating speeds of respective rotary elements.

Figure 6:
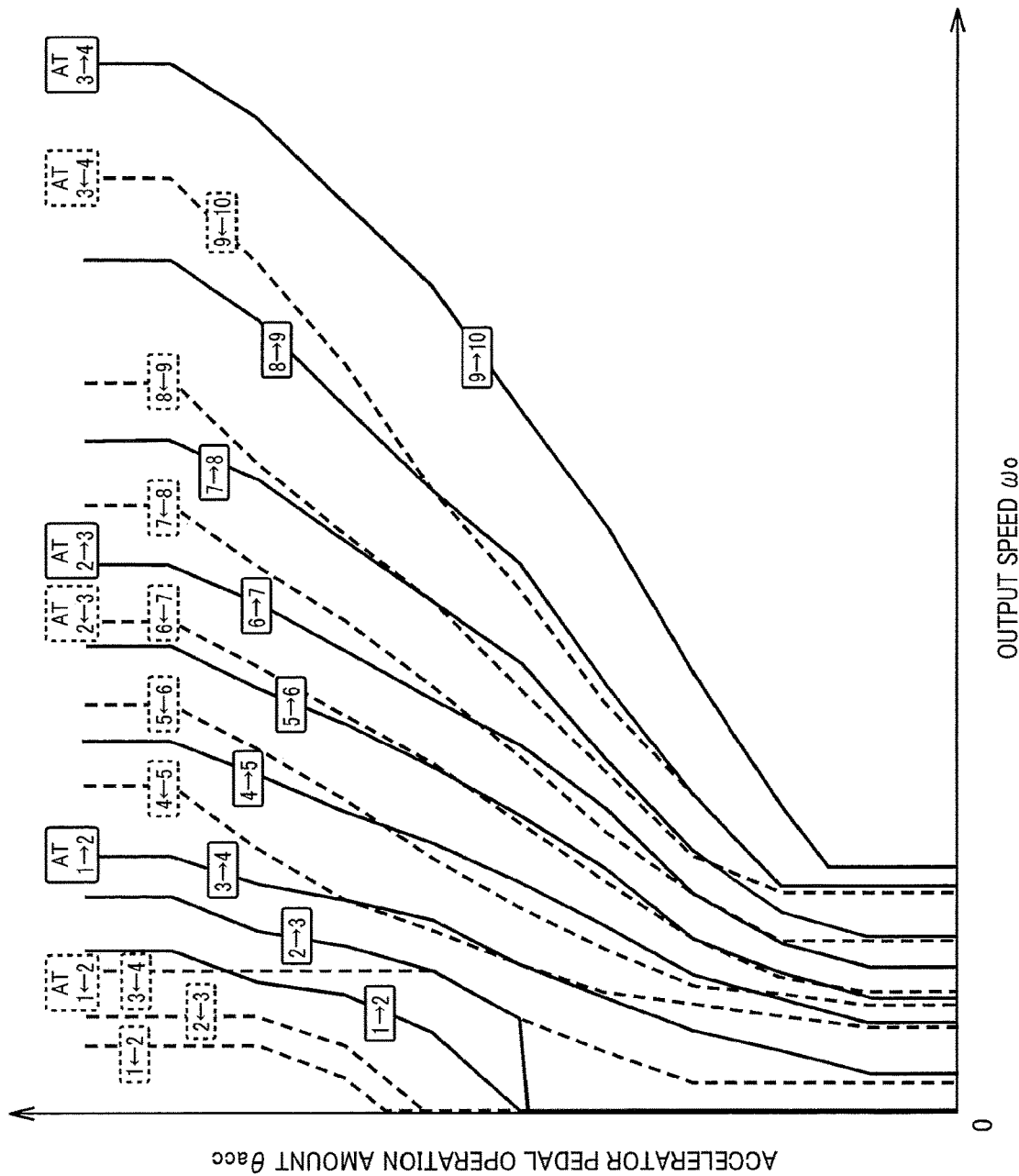
FIG. 6 is a view illustrating an example of an overall speed position shifting map used to shift up and down the transmission device from each of the overall speed positions to the adjacent position or positions.

Like the AT gear position shifting map, the above-indicated overall speed position shifting map is a relationship between the output speed ωo and the accelerator pedal operation amount θacc used as parameters. FIG. 6 is the view illustrating an example of the overall speed position shifting map. In FIG. 6, solid lines indicate shift-up boundary lines while broken lines indicate shift-down boundary lines. The transmission device 40 consisting of the continuously variable transmission portion 18 and the step-variable transmission portion 20 which are disposed in series with each other is shifted from one of the overall speed positions to another according to the overall speed position shifting map, as if the transmission device 40 was shifted like a step-variable transmission as a whole. This overall step-variable shifting control to control the shifting actions of the transmission device 40 as the step-variable transmission as a whole may be implemented preferentially to the continuously variable shifting control of the transmission device 40 as the continuously variable transmission as a whole, only when a sporty drive mode or any other high-drivability drive mode is selected by the vehicle operator, or only when the required drive torque Tdem is comparatively large, but may be principally implemented except where the overall step-variable shifting control is restricted or inhibited.

The overall step-variable shifting control by the hybrid control portion 84 and the shifting control of the step-variable transmission portion 20 by the transmission shifting control portion 82 are implemented in cooperation with each other. In this embodiment, the first through tenth overall speed positions are established for the first through fourth speed AT gear positions. When the transmission device 40 is shifted between the fourth overall speed position and the third overall speed position, for example, the step-variable transmission portion 20 is shifted between the second speed AT gear position and the first speed AT gear position. When the transmission device 40 is shifted between the seventh overall speed position and the sixth overall speed position, the step-variable transmission portion 20 is shifted between the third speed AT gear position and the second speed AT gear position. When the transmission device 40 is shifted between the tenth overall speed position and the ninth overall speed position, the step-variable transmission portion 20 is shifted between the fourth speed AT gear position and the third speed AT gear position. Therefore, the AT gear position shifting map is formulated so that the AT gear position shifting operation is performed in synchronization with the overall speed position shifting operation. Described more specifically by reference to FIG. 6, shift-up boundary lines for respectively shifting the transmission device 40 from the third overall speed position to the fourth overall speed position, from the sixth overall speed position to the seventh overall speed position, and from the ninth overall speed position to the tenth overall speed position coincide with shift-up boundary lines for respectively shifting the step-variable transmission portion 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission portion 20 from the second speed AT gear position to the first speed AT gear position (indicated as "AT1←2" in FIG. 6), from the third speed AT gear position to the second speed AT gear position, and from the fourth speed AT gear position to the third speed AT gear position. Alternatively, a command to shift the step-variable transmission portion 20 may be applied to the transmission shifting control portion 82 in response to a determination according to the overall speed position shifting map of FIG. 6 that the transmission device 40 should be shifted from one overall speed position to another. Thus, the transmission shifting control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine speed ωe, so that the vehicle operator is less likely to uncomfortably recognize a shifting shock of the step-variable transmission portion 20.

The hybrid control portion 84 selectively establishes the motor drive mode or the hybrid drive mode, depending upon a running state of the vehicle 10. For example, the hybrid control portion 84 selects the motor drive mode when the required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

The hybrid control portion 84 is configured to control the second motor/generator MG2 to generate the reverse drive MG2 torque TmR according to the accelerator pedal operation amount θacc, with the step-variable transmission portion 20 being placed in the first speed AT gear position while the shift lever 56 is placed in the reverse drive position R.

There will be described a shifting control of the step-variable transmission portion 20 which is implemented when the step-variable transmission portion 20 is shifted down from the second speed AT gear position to the first speed AT gear position in a coasting run of the vehicle 10, which is an example of a coasting shift-down action of the step-variable transmission portion 20 to its forward-drive low-speed gear position. In this coasting shift-down action while the accelerator pedal is placed in the non-operated position, the AT input speed ωi can not be raised to a post-shift-down synchronizing speed ωisyca (ωo*post-shift-down speed ratio γata) when the engaging torque Tcb of the engaging-side coupling device CB which is to be brought into the engaged state to establish the forward-drive low-speed gear position is not generated. On the other hand, the AT input speed ωi can be raised to the post-shift-down synchronizing speed ωisyca to permit the shift-down action, by controlling the above-indicated coupling device CB to generate the engaging torque Tcb, or by temporarily increasing the AT input torque Ti above its required value, for example. The present embodiment is configured to implement an ordinary control of the coasting shift-down action of the step-variable transmission portion 20 from the second speed AT gear position to the first speed AT gear position. In this ordinary control, the AT input torque Ti is temporarily increased above the required value by placing both of the releasing-side coupling device CB (brake B1) and the engaging-side coupling device CB (brake B2) in the released state in which the engaging torque Tcb is not generated.

To implement the ordinary control of the coasting shift-down action from the second speed AT gear position to the first speed AT gear position, the transmission shifting control portion 82 includes first shift control means, namely, a first shift control portion 86 which is operated upon the coasting shift-down action of the step-variable transmission portion 20 from the second speed AT gear position to the first speed AT gear position. The first shift control portion 86 is configured to temporarily increase the forward drive MG2 torque TmF above its required value (for example, to command the hybrid control portion 84 to temporarily increase the forward drive MG2 torque TmF above the required value), for thereby temporarily increasing the input torque Ti of the step-variable transmission portion 20, to raise the AT input speed ωi toward the post-shift-down synchronizing speed ωisyca (namely, synchronizing speed ωisyc1 in the first speed AT gear position=ωo*speed ratio γat1 of the first speed AT gear position). After the AT input speed ωi has been raised to a predetermined value, the first shift control portion 86 commands the engaging-side coupling device (brake B2 which was placed in its released state before the shift-down action) to be brought into its engaged state. The predetermined value indicated above is a threshold value above which the AT input speed ωi is considered to be high enough to permit reduction of a shifting shock of the step-variable transmission portion 20 even where the engaging-side coupling device CB is abruptly brought into the engaged state. This threshold value may be set to be equal to the synchronizing speed ωisyc1 in the first speed AT gear position, or a value which is lower than, but close to the synchronizing speed ωisyc1.

The first shift control portion 86 temporarily increases the forward drive MG torque TmF above the required value, to temporarily increase the AT input torque Ti above the required value. For example, this required value of the AT input torque Ti is a value obtained by conversion of the required drive torque Tdem into a torque value of the intermediate power transmitting member 30. Since the accelerator pedal is placed in the non-operated position upon the coasting shift-down action, the required value of the AT input torque Ti is set, for example, to be almost equal to a so-called "creep torque" which enables the vehicle 10 to slowly move in a creeping manner. The required value of the MG2 torque TmF of the second motor/generator MG2 is a value which permits the required value of the AT input torque Ti to be obtained.

Figure 7:
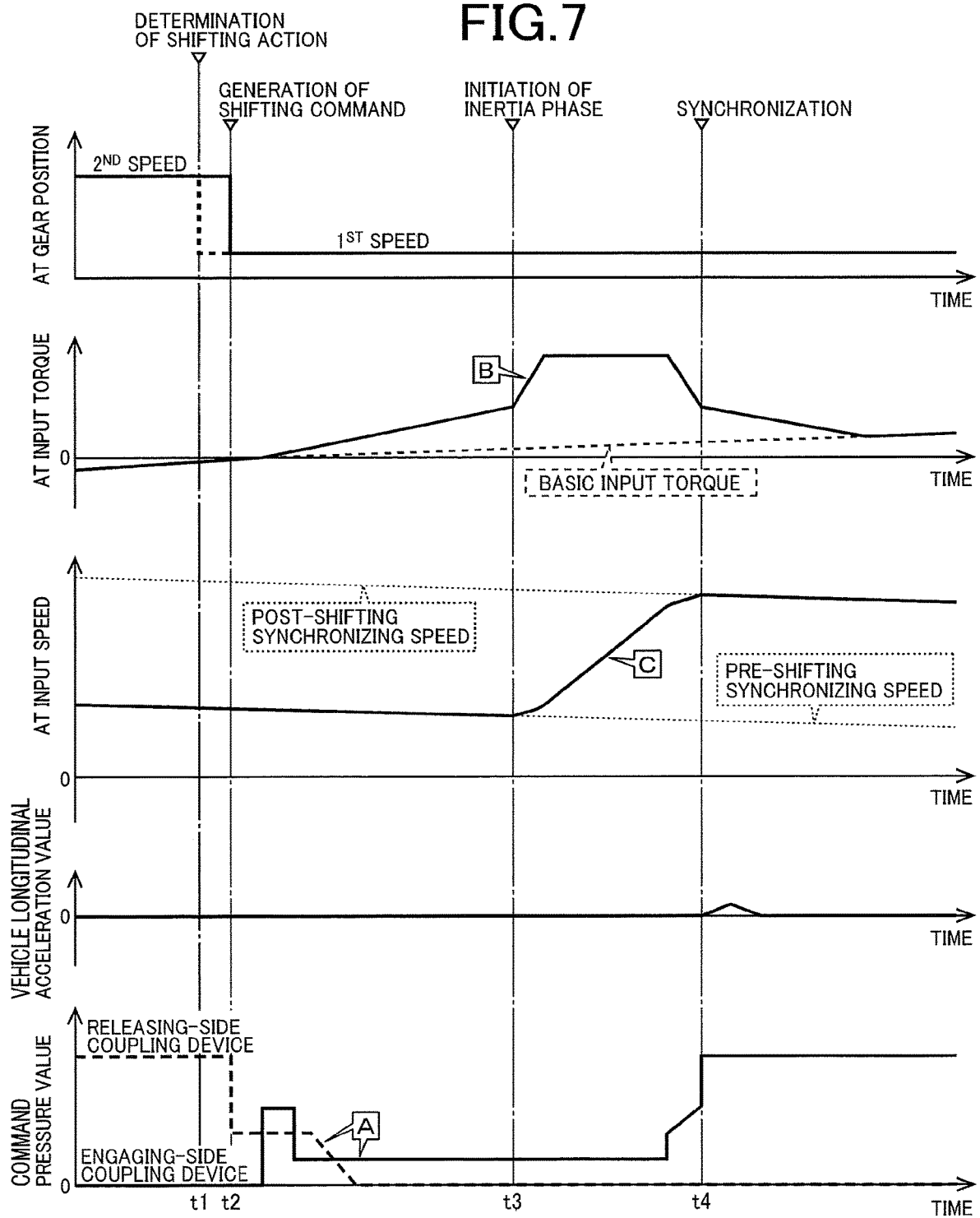
FIG. 7 is a time chart illustrating an example of changes of various parameters when the transmission device is controlled according to an ordinary control implemented during a shift-down action of the step-variable transmission portion from its second speed gear position to its first speed gear position in a coasting run of the vehicle.

FIG. 7 is the time chart illustrating an example of changes of various parameters when the transmission device 40 is controlled according to the ordinary control implemented by the first shift control portion 86 during the coasting shift-down action of the step-variable transmission portion 20 from the second speed AT gear position to the first speed AT gear position. In the example of FIG. 7, a determination of requirement for the coasting shift-down action of the step-variable transmission portion 20 from the second speed AT gear position to the first speed AT gear position is made at a point of time t1 (as indicated by a broken line in a graph of "AT GEAR POSITION"), and a shifting command to implement the coasting shift-down action is generated at a point of time t2 (as indicated by a solid line in the graph of "AT GEAR POSITION"). When the shifting command is generated, a command pressure value corresponding to the engaging torque Tcb of the releasing-side coupling device CB is abruptly lowered to bring the releasing-side coupling device CB into the released state, while a command pressure value corresponding to the engaging torque Tcb of the engaging-side coupling device CB is controlled so as to follow a pattern of change to substantially fill its hydraulic cylinder with the working fluid, and is held at a value slightly lower than a value at which the engaging-side coupling device CB actually has the predetermined engaging torque Tcb (as indicated by an arrow symbol "A"). The AT input torque Ti is subjected to a torque increasing control, that is, is controlled to be temporarily increased above its required value while both of the releasing-side and engaging-side coupling devices CB do not actually have the engaging torque Tcb (as indicated by an arrow symbol "B"). A basic input torque Ti indicated by a broken line in a graph of "AT INPUT TORQUE" is a torque which is equal to the required AT input torque value minus a negative (driven) torque acting on the intermediate power transmitting member 30 (minus a torque received from the drive wheels 28). Since the negative torque decreases with a decrease of the vehicle running speed V, the basic input torque increases with the decrease of the vehicle running speed V, as long as the required AT input torque value is held unchanged. As a result of the above-indicated torque increasing control, a rise of the AT input speed ωi toward the post-shift-down synchronizing speed ωisyca is initiated, and an inertia phase of the coasting shift-down action is initiated (at a point of time t3), whereby the coasting shift-down action of the step-variable transmission portion 20 progresses (as indicated by an arrow symbol "C"). When the AT input speed ωi has been raised to the predetermined value, the command pressure value for the engaging torque Tcb of the engaging-side coupling device CB is abruptly increased to bring the engaging-side coupling device CB into the engaged state (during a time period from a point of time immediately prior to a point of time t4, to the point of time t4). The torque increasing control is terminated after completion of the engaging action of the engaging-side coupling device CB (after the point of time t4). Since the engaging-side coupling device CB is brought into the engaged state when the AT input speed ωi has been raised to a value substantially equal to the post-shift-down synchronizing speed ωisyca, it is possible to reduce a degree of the shifting shock (represented by a change of the vehicle longitudinal acceleration value after the point of time t4) of the step-variable transmission portion 20 generated due to an abrupt engaging action of the engaging-side coupling device CB.

By the way, the shift lever 56 may be operated from the forward drive position D to the reverse drive position R during the coasting shift-down action of the step-variable transmission portion 20. Namely, the vehicle 10 may be required to be driven in the rearward direction, during its forward running. If the MG2 torque Tm is switched from the forward drive MG2 torque TmF to the reverse drive MG2 torque TmR immediately after the operation of the shift lever 56 from the forward drive position D to the reverse drive position R, that is, if the above-described torque increasing control to raise the AT input speed ωi is cancelled, the coasting shift-down action does not progress, giving rise to a problem of delayed generation of a reverse vehicle drive force.

Figure 10:
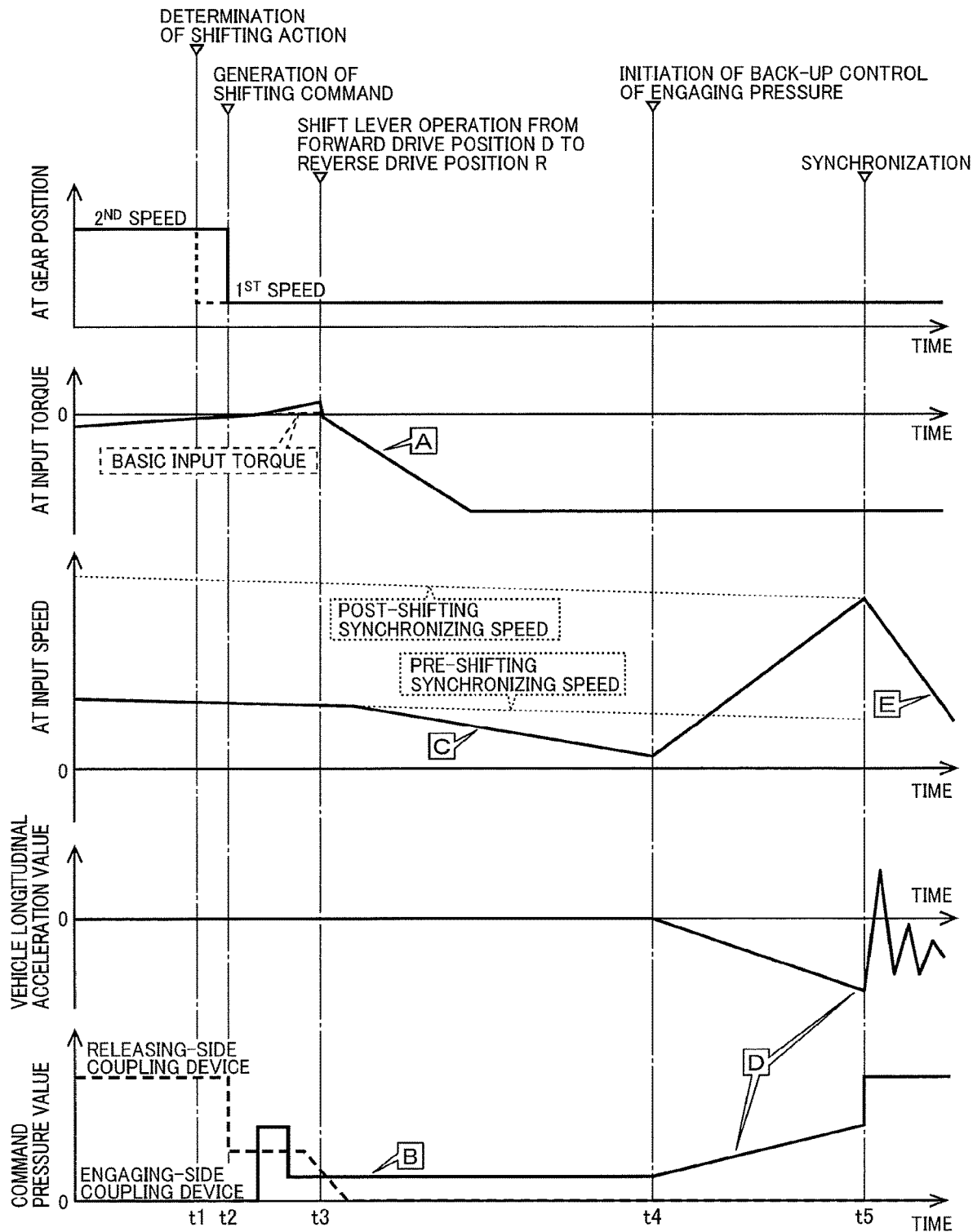
FIG. 10 is a time chart illustrating an example (comparative example) of changes of the various parameters where the transmission device is controlled according to the prior art when a shift lever is operated from a forward drive position D to a reverse drive position R during the shift-down action of the step-variable transmission portion form the second speed gear position to the first speed gear position in the coasting run of the vehicle.

FIG. 10 is the time chart illustrating an example (comparative example not according to the invention) of changes of the various parameters where the transmission device 40 is controlled according to the prior art when the shift lever 56 is operated from the forward drive position D to the reverse drive position R during the coasting shift-down action of the step-variable transmission portion 20. In the example of FIG. 10, a determination of requirement for the coasting shift-down action of the step-variable transmission portion 20 from the second speed AT gear position to the first speed AT gear position is made at a point of time t1 (as indicated by a broken line in a graph of "AT GEAR POSITION"), and a shifting command to implement the coasting shift-down action is generated at a point of time t2 (as indicated by a solid line in the graph of "AT GEAR POSITION"). At a point of t3, the shift lever 56 is operated from the forward drive position D to the reverse drive position R. As a result of the operation of the shift lever 56 from the forward drive position D to the reverse drive position R, the reverse drive MG2 torque TmR is generated (as indicated by an arrow symbol "A"). At this time, since both of the releasing-side coupling device CB and the engaging-side coupling device CB do not actually have the engaging torque Tcb, as in the example of FIG. 7 (as indicated by an arrow symbol "B"), there arises an undershoot of the AT input speed ωi (as indicated by an arrow symbol "C"), that is, a drop of the AT input speed ωi below the pre-shift-down synchronizing speed ωisycb (=ωo*pre-shift-down speed ratio γatb). Accordingly, the inertia phase will not be initiated, and a backup control of the engaging pressure of the engaging-side coupling device CB is initiated (at a point of time t4) by generation of the engaging torque Tcb so that the shift-down action of the step-variable transmission portion 20 progresses. As a result, the AT input speed ωi is raised toward the post-shift-down synchronizing speed ωisyca owing to the generation of the engaging torque Tcb of the engaging-side coupling device CB. However, there arise a drop of the vehicle drive torque, an engaging shock (synchronizing shock) of the engaging-side coupling device CB (as indicated by an arrow symbol "D") and thus a delayed in process of coasting shift-down action from the second speed AT gear position to the first speed AT gear position, giving rise to a problem of delayed generation (after a point of time t5) of the reverse vehicle drive force (namely, delayed initiation of rearward running of the vehicle 10).

To reduce the delay of generation of the reverse vehicle drive force upon requirement for switching to rearward running of the vehicle 10 during the coasting shift-down action of the step-variable transmission portion 20, the transmission shifting control portion 82 includes second shift control means, namely, a second shift control portion 88 which is operated upon requirement for switching to the rearward running of the vehicle 10 during the coasting shift-down action of the step-variable transmission portion 20. The second shift control portion 88 is configured to increase an engaging force of the engaging-side coupling device CB for bringing the engaging-side coupling device CB toward its engaged state (to raise the engaging hydraulic pressure Pcb of the engaging-side coupling device CB to enable the engaging-side coupling device CB to generate the engaging torque Tcb), to thereby raise the AT input speed ωi toward the post-shift-down synchronizing speed ωisyca (namely, toward the synchronizing speed ωisyc1 in the first speed AT gear position), to bring the engaging-side coupling device CB into the engaged state.

Namely, the second shift control portion 88 is configured to increase the engaging force of the engaging-side coupling device CB during the coasting shift-down action of the step-variable transmission portion 20 from the second speed AT gear position to the first speed AT gear position such that this engaging force increased under the control of the second shift control portion 88 is larger than the engaging force in the process of rise of the AT input speed ωi with a temporary increase of the input torque Ti of the step-variable transmission portion 20 under the control of the first shift control portion 86. Thus, the first shift control portion 86 is configured to implement a progress of the coasting shift-down action from the second speed AT gear position to the first speed AT gear position primarily by temporarily increasing the input torque Ti of the step-variable transmission portion 20, while the second shift control portion 88 is configured to implement the progress of the coasting shift-down action primarily by increasing the engaging force of the engaging-side coupling device CB to bring the engaging-side coupling device CB toward its engaged state.

Described more specifically, the electronic control device 80 further includes vehicle state determining means, namely, a vehicle state determining portion 90 which is configured to reduce the delay of generation of the reverse vehicle drive force.

The vehicle state determining portion 90 determines whether the step-variable transmission portion 20 is in a coasting shift-down action (more specifically, the coasting shift-down action from the second speed AT gear position to the first speed AT gear position) during the forward running of the vehicle 10. This determination is made on the basis of the hydraulic control command signals Sat. Further, the vehicle state determining portion 90 determines whether the shift lever 56 is operated from the forward drive position D to the reverse drive position R (namely, whether the vehicle 10 is required to be driven in the rearward direction during its forward running). This determination is made on the basis of the presently selected operating position POSsh of the shift lever 56.

The first shift control portion 86 implements the ordinary control of the coasting shift-down action of the step-variable transmission portion 20 from the second speed AT gear position to the first speed AT gear position, when the vehicle state determining portion 90 has determined that the shift lever 56 is not operated from the forward drive position D to the reverse drive position R during the coasting shift-down action.

When the vehicle state determining portion 90 has determined that the shift lever 56 is operated from the forward drive position D to the reverse drive position R during the coasting shift-down action of the step-variable transmission portion 20 from the second speed AT gear position to the first speed AT gear position in the forward drive position D of the shift lever 56, the second shift control portion 88 implements an alternative control in place of the ordinary control of the coasting shift-down action from the second speed AT gear position to the first speed AT gear position. In this alternative control, the second shift control portion 88 increases the engaging force of the above-indicated engaging-side coupling device CB for bringing the engaging-side coupling device CB toward its engaged state, to thereby raise the AT input speed $\omega i$ toward the synchronizing speed $\omega isyc1$ in the first speed AT gear position, namely, to generate the hydraulic control command signal Sat for raising the engaging hydraulic pressure Pcb toward a value for engagement of the engaging-side coupling device CB, that is, to supply the hydraulic control unit 54 with the hydraulic control command signal Sat for raising the engaging hydraulic pressure Pcb to a value higher than that established by the ordinary control implemented by the first shift control portion 86. After the AT input speed $\omega i$ has been raised to the predetermined value, the second shift control portion 88 supplies the hydraulic control unit 54 with the hydraulic control command signal Sat for abruptly increasing the engaging torque Tcb of the engaging-side coupling device CB, to bring this coupling device CB into its engaged state.

The AT input speed $\omega i$ can be raised toward the synchronizing speed $\omega isyc1$ in the first speed AT gear position by increasing the engaging force of the engaging-side coupling device CB for bringing the engaging-side coupling device CB toward its engaged state upon the operation of the shift lever 56 from the forward drive position D to the reverse drive position R during the coasting shift-down action of the step-variable transmission portion 20 from the second speed AT gear position to the first speed AT gear position. If the reverse drive MG2 torque TmR is generated in response to the operation of the shift lever 56 from the forward drive position D to the reverse drive position R, there is a risk of failure to permit an adequate progress of the coasting shift-down action, due to a drop of the AT input speed $\omega i$ caused by the generated reverse drive MG2 torque TmR.

In view the above-described risk, the second shift control portion 88 commands the hybrid control portion 84 to limit the generation of the reverse drive MG2 torque TmR by the second motor/generator MG2, until the engaging action of the engaging-side coupling device CB is completed, for example, until a moment of determination that the AT input speed $\omega i$ has been raised to the synchronizing speed $\omega isyc1$ in the first speed AT gear position as a result of generation of the engaging torque Tcb sufficient to bring the engaging-side coupling device CB into the fully engaged state. When the engaging action of the engaging-side coupling device CB is completed, the second shift control portion 88 cancels the command applied to the hybrid control portion 84 to limit the generation of the reverse drive MG2 torque TmR. After the above-indicated command is cancelled, the hybrid control portion 84 permits the second motor/generator MG2 to initiate the generation of the reverse drive MG2 torque TmR, whereby the reverse drive torque is generated.

The second shift control portion 88 limits the generation of the reverse drive MG2 torque TmR by the second motor/generator MG2, by commanding the hybrid control portion 84 to inhibit the generation of the MG2 torque Tm by the second motor/generator MG2 (to zero the MG2 torque Tm), or to command the second motor/generator MG2 to generate the forward drive MG2 torque TmF. The forward drive MG2 torque TmF generated by the second motor/generator MG2 is not intended to promote a rise of the AT input speed $\omega i$, but is intended to reduce the risk of failure to permit the adequate progress of the coasting shift-down action of the step-variable transmission portion 20 from the second speed AT gear position to the first speed AT gear position, and is determined by taking account of the degree of delay of generation of the reverse vehicle drive force. When the reverse drive MG2 torque TmR is generated by the second motor/generator MG2, the second shift control portion 88 commands the hybrid control portion 84 to limit the value of the reverse drive MG2 torque TmR of the second motor/generator MG2 to a predetermined lower limit below which the risk of failure to permit the adequate progress of the coasting shift-down action can be reduced.

Figure 8:
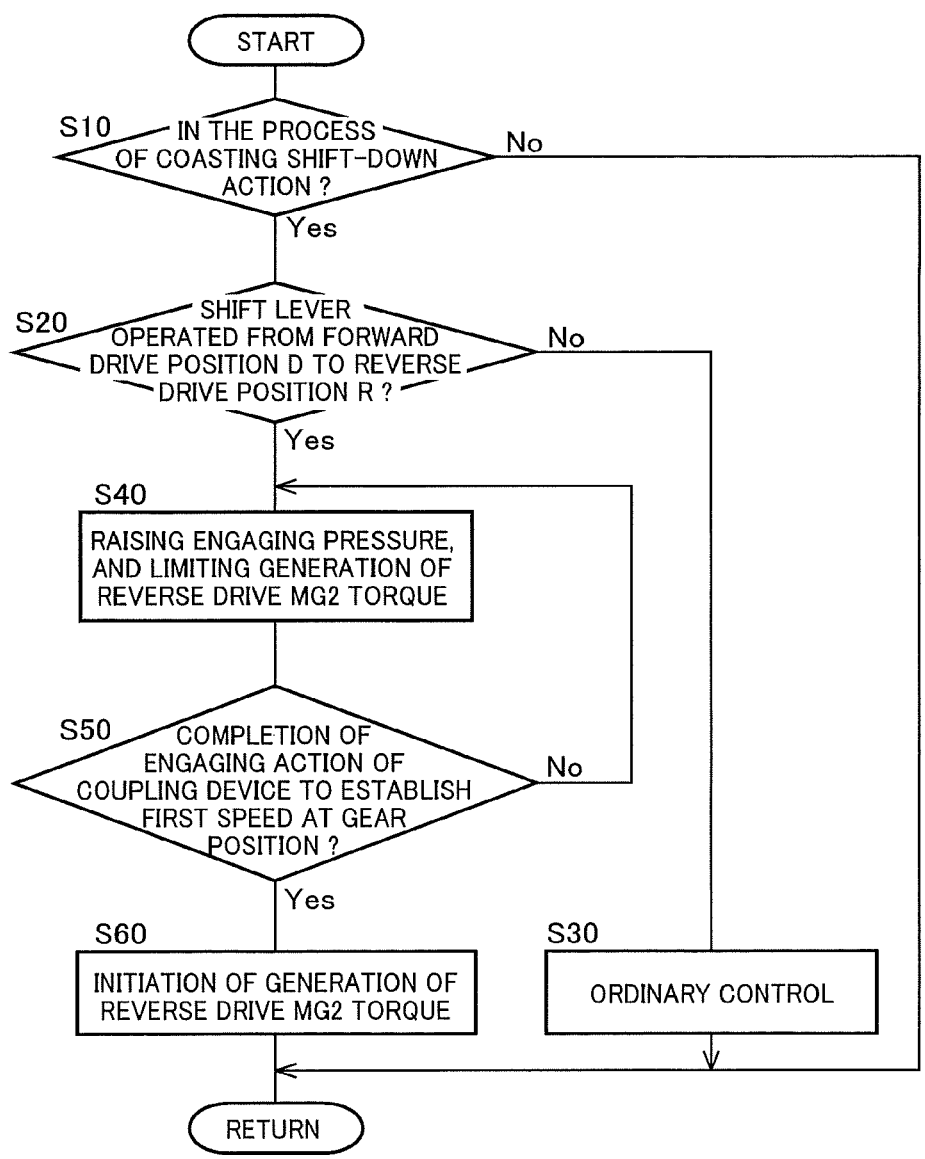
FIG. 8 is a flow chart illustrating an essential part of a control routine executed by an electronic control device, namely, a control operation to reduce delay of generation of a reverse vehicle drive force upon requirement for switching to reverse running of the vehicle during the shift-down action of the step-variable transmission portion in the coasting run of the vehicle.
Figure 9:
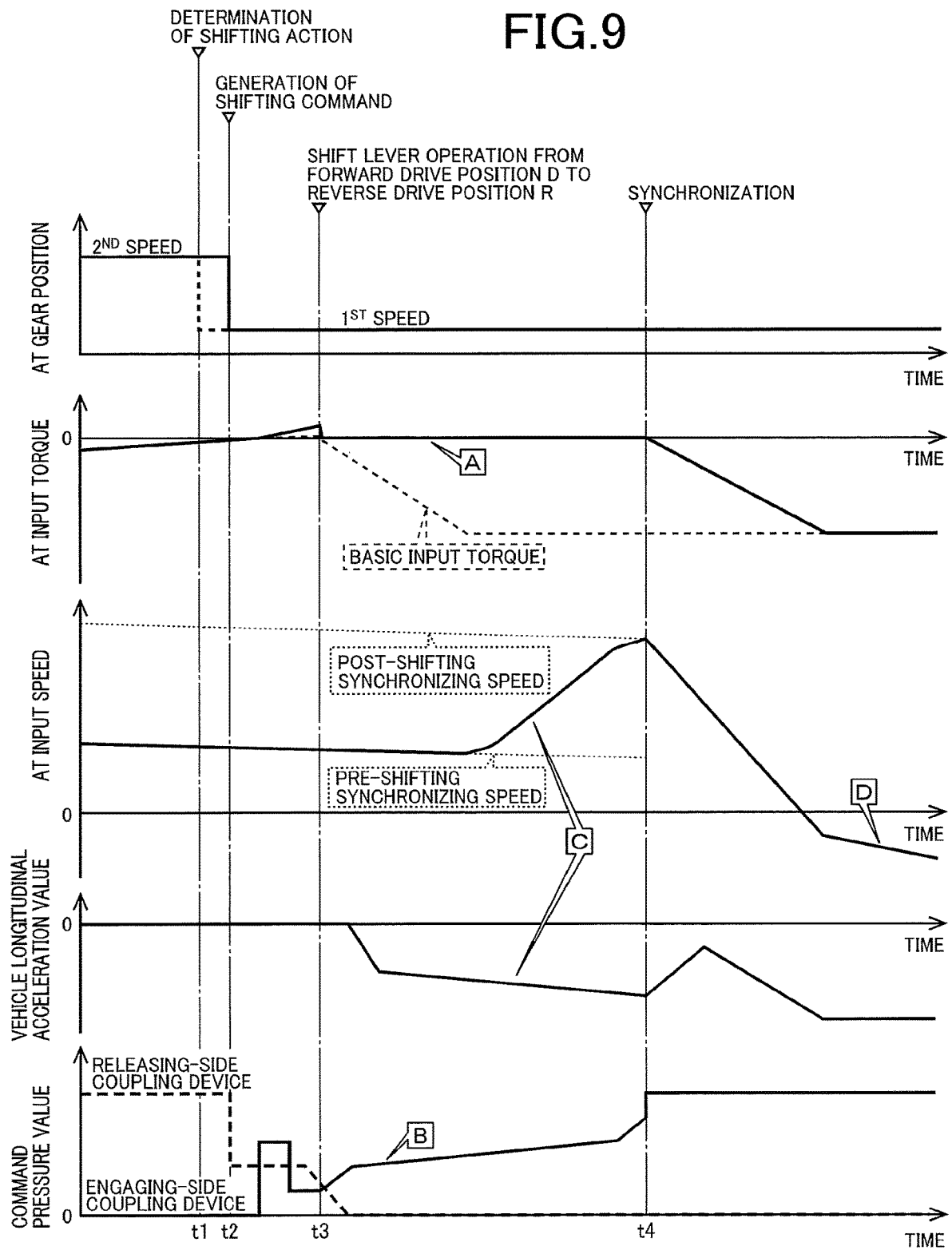
FIG. 9 is a time chart illustrating an example of changes of various parameters when the control routine illustrated in the flow chart of FIG. 8 is executed.

FIG. 8 is the flow chart illustrating an essential part of a control routine executed by the electronic control device 80, namely, a control operation to reduce the delay of generation of the reverse vehicle drive force upon requirement for switching to the reverse running of the vehicle 10 during the coasting shift-down action of the step-variable transmission portion 20. For instance, this control routine is repeatedly executed during a forward running of the vehicle 10. FIG. 9 is the time chart illustrating an example of changes of various parameters when the control routine illustrated in the flow chart of FIG. 8 is executed.

The control routine of FIG. 8 is initiated with a step S10 corresponding to the function of the vehicle state determining portion 90, to determine whether the step-variable transmission portion 20 is in the process of the coasting shift-down action (specifically, from the second speed AT gear position to the first speed AT gear position). If a negative determination is obtained in the step S10, one cycle of execution of the present control routine is terminated. If an affirmative determination is obtained in the step S10, the control flow goes to a step S20 also corresponding to the function of the vehicle state determining portion 90, to determine whether the shift lever 56 is operated from the forward drive position D to the reverse drive position R. If a negative determination is obtained in the step S20, the control flow goes to a step S30 corresponding to the function of the first shift control portion 86, to implement the ordinary control of the coasting shift-down action from the second speed AT gear position to the first speed AT gear position. If an affirmative determination is obtained in the step S20, the control flow goes to a step S40 corresponding to the function of the second shift control portion 88, to raise the engaging hydraulic pressure Pcb of the engaging-side coupling device CB to be brought into the engaged state to establish the first speed AT gear position, for bringing this engaging-side coupling device CB toward the engaged state, to thereby raise the AT input speed of toward the synchronizing speed ωisyc1 in the first speed AT gear position, namely, to raise the engaging hydraulic pressure Pcb toward a value higher than that established by the temporary increase of the AT input torque Ti to raise the AT input speed ωi in the ordinary control implemented by the first shift control portion 86. In addition, the generation of the reverse drive MG2 torque TmR by the second motor/generator MG2 is limited in the step S40, that is, the AT input torque Ti is zeroed (the generation of the AT input torque Ti is inhibited). Then, the control flow goes to a step S50 also corresponding to the function of the second shift control portion 88, to determine whether the engaging action of the engaging-side coupling device CB is completed to complete the coasting shift-down action of the step variable transmission portion 20 from the second speed AT gear position to the first speed AT gear position. If a negative determination is obtained in the step S50, the control flow goes back to the step S40. If an affirmative determination is obtained in the step S50, the control flow goes to a step S60 corresponding to the function of the hybrid control portion 84, to initiate the generation of the reverse drive MG2 torque TmR which has been limited, whereby the reverse drive torque is generated.

In the example of FIG. 9, the determination of requirement for the coasting shift-down action of the step-variable transmission portion 20 from the second speed AT gear position to the first speed AT gear position is made at a point of time t1 (as indicated by a broken line in a graph of "AT GEAR POSITION"), and a shifting command to implement the coasting shift-down action is generated at a point of time t2 (as indicated by a solid line in the graph of "AT GEAR POSITION"). At a point of time t3, the shift lever 56 is operated from the forward drive position D to the reverse drive position R. A broken line in a graph of "AT INPUT TORQUE" indicates the basic input torque Ti in the comparative example of FIG. 10 in which the reverse drive MG2 torque TmR is generated immediately after the operation of the shift lever 56 from the forward drive position D to the reverse drive position R. In the present embodiment, on the other hand, the generation of the reverse drive MG2 torque TmR is limited as indicated by a solid line (as indicated by an arrow symbol "A"), and the engaging hydraulic pressure Pcb of the engaging-side coupling device CB to be brought into the engaged state to establish the first speed AT gear position is increased to bring the engaging-side coupling device CB toward the engaged state, for thereby raising the AT input speed ωi toward the synchronizing speed ωisyc1 in the first speed AT gear position (as indicated by an arrow symbol "B"). Accordingly, the present embodiment permits the adequate progress of the coasting shift-down action from the second speed AT gear position to the first speed AT gear position (as indicated by an arrow symbol "C"), and completion of the coasting shift-down action at a point of time t4, although the step-variable transmission portion 20 more or less suffers from a drop of the generated drive torque. Thus, the present embodiment permits reduction of delay of the progress of the coasting shift-down action, and consequent reduction of delay of initiation of the rearward running of the vehicle 10 (as indicated by an arrow symbol "D").

As described above, the present embodiment is configured such that upon requirement for switching to the rearward running of the vehicle 10 during the coasting shift-down action of the step-variable transmission portion 20 from the second speed AT gear position to the first speed AT gear position, the engaging force of the engaging-side coupling device CB is increased to bring the engaging-side coupling device CB toward its engaged state, for thereby raising the input speed ωi of the step-variable transmission portion 20 toward the synchronizing speed ωisyc1 in the first speed AT gear position, to bring the engaging-side coupling device CB into its engaged state. Accordingly, the coasting shift-down action of the step-variable transmission portion 20 can progress even if the rise of the AT input speed ωi toward the synchronizing speed ωisyc1 as a result of the temporary increase of the forward drive MG2 torque TmF above the required value is stopped in response to the requirement for switching to the rearward running of the vehicle 10. Therefore, the present embodiment makes it possible to reduce the delay of generation of the reverse vehicle drive force upon the requirement for switching to the rearward running of the vehicle 10 during the coasting shift-down action of the step-variable transmission portion 20.

The present embodiment is further configured such that the second shift control portion 88 limits generation of the reverse drive MG2 torque TmR of the second motor/generator MG2 until the engaging action of the engaging-side coupling device CB is completed if a switching to the rearward running of the vehicle 10 is requested during the coasting shift-down action of the step variable transmission portion 20. Accordingly, the amount of drop of the AT input speed ωi due to the reverse drive MG2 torque TmR is reduced, making it possible to reduce the risk of failure to implement the adequate progress of the coasting shift-down action of the step-variable transmission portion 20 from the second speed AT gear position to the first speed AT gear position. Thus, the delay of generation of the reverse vehicle drive force can be effectively reduced.

While the preferred embodiment of this invention has been described in detail by reference to the drawings, it is to be understood that the invention may be otherwise embodied.

Figure 11:
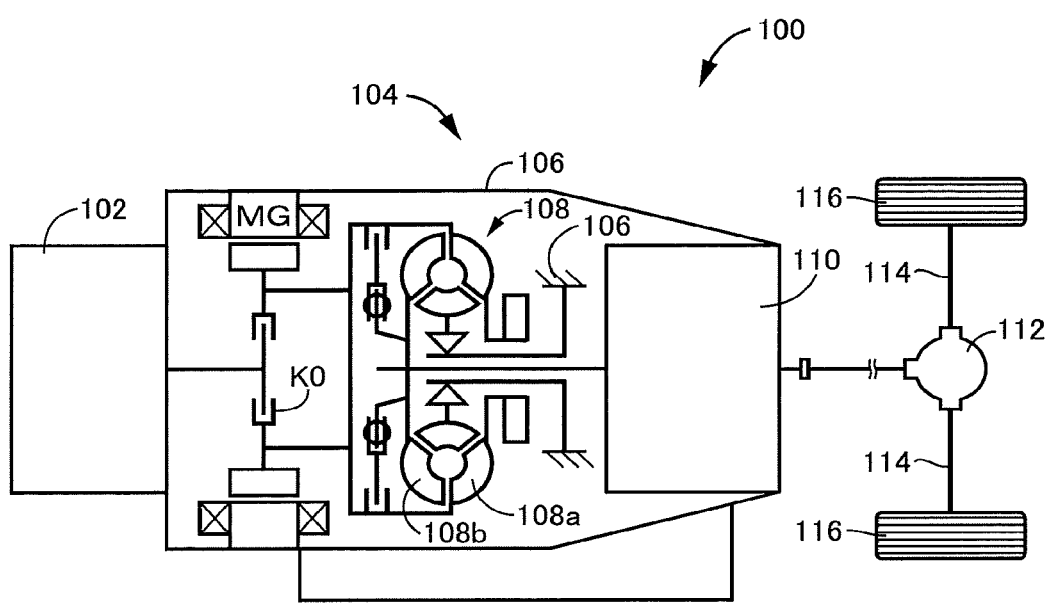
FIG. 11 is a schematic view showing an arrangement of another type of vehicular drive system different from that of FIG. 1, which is to be controlled by the control apparatus according to the present invention.

In the embodiments, the control apparatus is configured to control the vehicle 10 provided with the continuously variable transmission portion 18 and the step-variable transmission portion 20 which are disposed in series with each other. However, the control apparatus according to the present invention may be configured to control a vehicle 100 shown in FIG. 11. The vehicle 100 is a hybrid vehicle provided with an engine 102 functioning as a vehicle drive power source, a motor/generator MG which is an electric motor functioning as a drive power source, and a power transmitting system 104. As shown in FIG. 11, the power transmitting system 104 includes a clutch K0, a torque converter 108 and a step-variable transmission 110, which are disposed within a stationary member in the form of a casing 106 fixed to a body of the vehicle 100, in this order of description as seen in the direction from the engine 102. The power transmitting system 104 further includes a differential gear device 112 and axles 114. The torque converter 108 has a pump impeller 108a selectively connected to the engine 102 through the clutch K0 and directly connected to the motor/generator MG, and a turbine impeller 108b directly connected to the step-variable transmission 110. In the power transmitting system 104, a drive force of the engine 102 and/or a drive force of the motor/generator MG are/is transmitted to drive wheels 116 through the clutch K0 (where the drive force of the engine 102 is transmitted), the torque converter 108, the step-variable transmission 110, the differential gear device 112 and the axles 114, in this order of description. The step-variable transmission 110 is a planetary gear type automatic transmission.

The vehicle 100 may not be provided with the engine 102, the clutch K0 and the torque converter 108. In this case, the motor/generator MG is directly connected to an input rotary member of the step-variable transmission 110. Namely, the control apparatus according to the present invention is applicable to a vehicle which is provided with an electric motor functioning as a drive power source, and a step-variable transmission which constitutes a part of a power transmitting path between the electric motor and drive wheels. While the vehicle 100 uses the torque converter 108 as a fluid-operated power transmitting device, the vehicle 100 may use other types of fluid-operated power transmitting devices such as a fluid coupling not having a torque boosting function. Further, the torque converter 108 need not be provided, or may be replaced by a device having a simple clutch function.

In the ordinary control of the coasting shift-down action of the step-variable transmission portion 20 from the second speed AT gear position to the first speed AT gear position according to the illustrated embodiments, the first shift control portion 86 is configured to permit the adequate progress of the coasting shift-down action, by temporarily increasing the AT input torque Ti while both of the releasing-side coupling device CB (brake B1) and the engaging-side coupling device CB (brake B2) are placed in the released state in which the engaging torque Tcb is not generated. However, the first shift control portion 86 is not limited to this configuration. Namely, the first shift control portion 86 may implement the ordinary control so as to permit the adequate progress of the coasting shift-down action primarily by increasing the AT input torque Ti of the step-variable transmission portion 20 while the engaging-side coupling device CB has the engaging torque Tcb. The engaging force of the engaging-side coupling device CB controlled by the second shift control portion 88 in the process of the coasting shift-down action from the second speed AT gear position to the first speed AT gear position is larger than that controlled in the ordinary control by the first shift control portion 86 in the process of progress of the coasting shift-down action in which the AT input torque Ti is temporarily increased.

In the illustrated embodiments, the step-variable transmission portion 20 is a planetary gear type automatic transmission having the four AT gear positions for forward driving of the vehicle 10. However, the step-variable transmission portion 20 need not have the four AT gear positions, as long as the step-variable transmission portion 20 has a plurality of gear positions each of which is selectively established with engagement of selected at least one of a plurality of coupling devices. That is, the step-variable transmission portion 20 which is the planetary gear type automatic transmission in the embodiments may be replaced by any other type of automatic transmission such as a known DCT (Dual Clutch Transmission) which is a synchronous meshing parallel two-axes type automatic transmission having two input shafts which are provided with respective coupling devices (clutches) and which are operatively connected to respective two shifting units having respective even-numbered gear positions and odd-numbered gear positions. In the DCT type automatic transmission, coupling devices connected to respective inputs of the two shifting units correspond to the selected ones of the plurality of coupling devices to be controlled by the control apparatus according to the present invention.

In the illustrated embodiments, the first speed AT gear position is described as an example of the forward-drive low-speed position of the step-variable transmission portion 20. However, the forward-drive low-speed position is not limited to the first speed AT gear position. If the rearward running of the vehicle 10, 100 is required while the step-variable transmission portion 20 is placed in the second speed AT gear position, for example, the forward-drive low-speed position is the first speed AT gear position and/or the second speed AT gear position. In this case, the coasting shift-down action to the forward-drive low-speed position is the coasting shift-down action from the second speed AT gear position to the first speed AT gear position and/or the coasting shift-down action from the third speed AT gear position to the second speed AT gear position.

In the illustrated embodiments, the step-variable transmission portion 20 does not have an exclusive reverse drive gear position in which the direction of rotation of the output rotary member of the step-variable transmission portion 20 is reversed with respect to that of the input rotary member. However, the step-variable transmission to be controlled by the control apparatus according to the invention is not limited to the step-variable transmission portion 20. For instance, the present control apparatus is equally applicable to a vehicle which is provided with a step-variable transmission having the above-indicated exclusive reverse drive gear position and which can be driven in the rearward direction while the step-variable transmission is placed in a forward drive AT gear position as well as in the exclusive reverse drive gear position.

In the illustrated embodiments, the transmission device 40 as a whole is shifted to a selected one of the overall speed positions, like a step-variable transmission, according to the overall speed position shifting map. However, the transmission device 40 may be shifted to the selected overall speed position according to an operation of the shift lever 56, a shift-up/shift-down switch or any other member operated by the vehicle operator to shift the transmission device 40.

In the illustrated embodiments, the ten overall speed positions are established for the four AT gear positions. Although the number of the overall speed positions may be equal to the number of the AT gear positions, the number of the overall speed positions is preferably larger than the number of the AT gear positions, for instance, twice or more of the number of the AT gear positions. The numbers of the AT gear positions and the overall speed positions are suitably determined, as long as the step-variable transmission portion is shifted such that the rotating speed of the intermediate power transmitting member 30 and the operating speed of the second motor/generator MG2 connected to the intermediate power transmitting member 30 are held within respective predetermined ranges, and the transmission device 40 is shifted such that the engine speed ωe is held with a predetermined range.

In the illustrated embodiments, the differential mechanism 32 is the planetary gear set of the single-pinion type having the three rotary elements. However, the differential mechanism 32 may be replaced by a differential mechanism including a plurality of planetary gear sets which are connected to each other and which have four or more rotary elements. Alternatively, the differential mechanism 32 may be a planetary gear set of a double-pinion type, or a differential gear device including a pinion rotated by the engine 14 and a pair of bevel gears which mesh with the pinion and which are connected to the first motor/generator MG1 and the intermediate power transmitting member 30.

It is to be understood that the embodiments and modifications described above are given for illustrative purpose only, and that the present invention may be embodied with various other changes and improvements which may occur to those skilled in the art.

NOMENCLATURE OF ELEMENTS

10: Vehicle
14: Engine
20: Mechanically operated step-variable transmission portion (Step-variable transmission)
28: Drive wheels
80: Electronic control device (Control apparatus)
86: First shift control portion
88: Second shift control portion
CB: Coupling devices
MG2: Second motor/generator (Electric motor)
100: Vehicle
110: Step-variable transmission
116: Drive wheels
MG: Motor/generator (Electric motor)

What is claimed is:

1. A control apparatus for a vehicle provided with an electric motor functioning as a drive power source, and a step-variable transmission which constitutes a part of a power transmitting path between the drive power source and vehicle drive wheels, said step-variable transmission being placed in a selected one of a plurality of speed positions with engagement of at least one coupling device selected from a plurality of coupling devices, wherein the vehicle runs in a rearward direction with a reverse drive torque of the electric motor which is generated when the step-variable transmission is placed in a forward-drive low-speed position of said plurality of speed positions, and wherein the reverse drive torque of the electric motor is opposite in direction to a forward drive torque of the electric motor, said control apparatus comprising:
a first shift control portion which is operated during a shift-down action of the step-variable transmission to the forward-drive low-speed position in a coasting run of the vehicle, the first shift control portion being configured to temporarily increase the forward drive torque of the electric motor above a required value of the forward drive torque of the electric motor, for thereby temporarily increasing an input torque of the step-variable transmission, to raise an input speed of the step-variable transmission toward a synchronizing speed in the forward-drive low-speed position, the first shift control portion being configured to command an engaging-side coupling device, which is said at least one coupling device selected from the plurality of coupling devices for the forward-drive low-speed position and which was placed in a released state of the engaging-side coupling device before the shift-down action, to be brought into an engaged state of the engaging-side coupling device after the input speed has been raised to the synchronizing speed or a predetermined speed; and
a second shift control portion operated when switching to rearward running of the vehicle is required during the shift-down action of the step-variable transmission in the coasting run of the vehicle, the second shift control portion being configured to increase an engaging force of the engaging-side coupling device for bringing the engaging-side coupling device toward the engaged state of the engaging-side coupling device, to thereby raise the input speed of the step-variable transmission toward the synchronizing speed in the forward-drive low-speed position, to bring the engaging-side coupling device into the engaged state.

2. The control apparatus according to claim 1, wherein the second shift control portion limits generation of the reverse drive torque of the electric motor until the engaging-side coupling device is brought into the engaged state.

3. The control apparatus according to claim 2, wherein the second shift control portion limits the generation of the reverse drive torque of the electric motor by inhibiting generation of the torque generated by the electric motor.

4. The control apparatus according to claim 2, wherein the second shift control portion limits the generation of the reverse drive torque of the electric motor by operating the electric motor to generate the forward drive torque.

5. The control apparatus according to claim 2, wherein the second shift control portion limits the generation of the reverse drive torque of the electric motor by limiting a value of the reverse drive torque to a predetermined lower limit.

6. A control apparatus for a vehicle provided with an electric motor functioning as a drive power source, and a step-variable transmission which constitutes a part of a power transmitting path between the drive power source and vehicle drive wheels, said step-variable transmission being placed in a selected one of a plurality of speed positions with engagement of at least one coupling device selected from a plurality of coupling devices, wherein the vehicle runs in a rearward direction with a reverse drive torque of the electric motor which is generated when the step-variable transmission is placed in a forward-drive low-speed position of said plurality of speed positions, and wherein the reverse drive torque of the electric motor is opposite in direction to a forward drive torque of the electric motor, said control apparatus comprising:
circuitry configured to:
temporarily increase the forward drive torque of the electric motor above a required value of the forward drive torque of the electric motor during a shift-down action of the step-variable transmission to the forward-drive low-speed position in a coasting run of the vehicle, for thereby temporarily increasing an input torque of the step-variable transmission, to raise an input speed of the step-variable transmission toward a synchronizing speed in the forward-drive low-speed position,
command an engaging-side coupling device, which is said at least one coupling device selected from the plurality of coupling devices for the forward-drive low-speed position and which was placed in a released state of the engaging-side coupling device before the shift-down action, to be brought into an engaged state of the engaging-side coupling device after the input speed has been raised to the synchronizing speed or a predetermined speed; and
increase an engaging force of the engaging-side coupling device for bringing the engaging-side coupling device toward the engaged state of the engaging-side coupling device when switching to rearward running of the vehicle is required during the shift-down action of the step-variable transmission in the coasting run of the vehicle, to thereby raise the input speed of the step-variable transmission toward the synchronizing speed in the forward-drive low-speed position, to bring the engaging-side coupling device into the engaged state.

7. The control apparatus according to claim 6, wherein the circuitry is configured to limit generation of the reverse drive torque of the electric motor until the engaging-side coupling device is brought into the engaged state.

8. The control apparatus according to claim 7, wherein the circuitry is configured to limit the generation of the reverse drive torque of the electric motor by inhibiting generation of the torque generated by the electric motor.

9. The control apparatus according to claim 7, wherein the circuitry is configured to limit the generation of the reverse drive torque of the electric motor by operating the electric motor to generate the forward drive torque.

10. The control apparatus according to claim 7, wherein the circuitry is configured to limit the generation of the reverse drive torque of the electric motor by limiting a value of the reverse drive torque to a predetermined lower limit.

* * * * *